US 012075464B2

(12) United States Patent
Xiao et al.

(10) Patent No.: US 12,075,464 B2
(45) Date of Patent: Aug. 27, 2024

(54) COMMUNICATION METHOD AND APPARATUS

(71) Applicant: HUAWEI TECHNOLOGIES CO., LTD., Guangdong (CN)

(72) Inventors: Jiehua Xiao, Shenzhen (CN); Xinxian Li, Shanghai (CN); Hao Tang, Ottawa (CA); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 17/592,217

(22) Filed: Feb. 3, 2022

(65) Prior Publication Data

US 2022/0159710 A1    May 19, 2022

Related U.S. Application Data

(63) Continuation of application No. PCT/CN2020/109358, filed on Aug. 14, 2020.

(30) Foreign Application Priority Data

Aug. 16, 2019  (CN) .......................... 201910760950.7

(51) Int. Cl.
  *H04W 72/1263*  (2023.01)
  *H04W 74/00*  (2009.01)
  *H04W 74/08*  (2024.01)
  *H04W 74/0833*  (2024.01)
(52) U.S. Cl.
  CPC ..... *H04W 74/002* (2013.01); *H04W 72/1263* (2013.01); *H04W 74/0841* (2013.01); *H04W 74/0866* (2013.01)

(58) Field of Classification Search
  None
  See application file for complete search history.

(56) References Cited

U.S. PATENT DOCUMENTS

2012/0300714 A1  11/2012  Ng et al.
2013/0064195 A1  3/2013  Chang
(Continued)

FOREIGN PATENT DOCUMENTS

CN  102325382 A  1/2012
CN  103313375 A  9/2013
(Continued)

OTHER PUBLICATIONS

1 Office Action issued in Chinese Application No. 201910760950.7 on Jul. 4, 2022, 9 pages.

(Continued)

*Primary Examiner* — Marcus Smith
(74) *Attorney, Agent, or Firm* — Fish & Richardson P.C.

(57) ABSTRACT

This application discloses example communication methods and example apparatuses. One example method includes receiving control information from a network device in a first cell, where the control information indicates to initiate a random access process in a second cell, and the control information includes a first identifier of the second cell. A random access process can then be initiated, based on the control information, in the second cell by using a random access parameter associated with the first identifier.

17 Claims, 9 Drawing Sheets

(56) References Cited

U.S. PATENT DOCUMENTS

| | | | |
|---|---|---|---|
| 2013/0083739 A1* | 4/2013 | Yamada | H04W 74/006 370/329 |
| 2015/0071198 A1 | 3/2015 | Deng | |
| 2017/0374688 A1 | 12/2017 | Lee et al. | |
| 2018/0020483 A1 | 1/2018 | Lee et al. | |
| 2021/0022180 A1* | 1/2021 | Lei | H04L 5/10 |
| 2022/0159579 A1* | 5/2022 | Cirik | H04W 52/242 |

FOREIGN PATENT DOCUMENTS

| | | | |
|---|---|---|---|
| CN | 103327637 | A | 9/2013 |
| CN | 104081862 | B | 1/2018 |
| CN | 107623947 | A | 1/2018 |
| CN | 105052233 | B | 3/2019 |
| CN | 106160973 | B | 4/2019 |
| CN | 104247303 | B | 6/2019 |
| CN | 106537970 | B | 5/2020 |
| WO | 2012135998 | A1 | 10/2012 |
| WO | 2012154955 | A1 | 11/2012 |

OTHER PUBLICATIONS

Extended European Search Report issued in European Application No. 20855243.0 on Jun. 21, 2022, 7 pages.

Huawei et al., "Correction to RA on SCell for TA alignment in TS 38.300," 3GPP TSG-RAN WG2 Meeting 101bis, R2-1805873, Sanya, China, Apr. 16-20, 2018, 3 pages.

PCT International Search Report and Written Opinion issued in PCT/CN2020/109358 on Nov. 17, 2020, 12 pages (partial English translation).

EP Communication Pursuant to Article 94(3) EPC in European Appln No. 20855243.0, dated Mar. 2, 2023, 6 pages.

* cited by examiner

COMMUNICATION METHOD AND APPARATUS

CROSS-REFERENCE TO RELATED APPLICATIONS

This application is a continuation of International Application No. PCT/CN2020/109358, filed on Aug. 14, 2020, which claims priority to Chinese Patent Application No. 201910760950.7, filed on Aug. 16, 2019. The disclosures of the aforementioned applications are hereby incorporated by reference in their entireties.

TECHNICAL FIELD

This application relates to the field of communication technologies, and in particular, to a communication method and an apparatus.

BACKGROUND

In a wireless communication system, as a quantity of intelligent terminal users is increasing, a user service volume and a data throughput are also increasing, and further, a higher requirement is imposed on a communication bandwidth and a communication rate.

In view of this, a carrier aggregation (CA) technology is introduced, to serve a terminal device through a plurality of cells. The plurality of cells include a primary cell (PCell) and one or more secondary cells (SCells). The primary cell may be determined during connection establishment between the terminal device and a network side, and is responsible for radio resource control (RRC) communication with the terminal device. The secondary cell may be added, modified, or released by using an RRC connection reconfiguration message after an initial security activation procedure, to provide additional radio resources. Important RRC communication (for example, RRC link establishment or release) is not performed between the secondary cell and the terminal device.

For example, a network device adds a secondary cell for the terminal device. The network device may indicate the terminal device to initiate a random access process in the newly added secondary cell. However, further research is still required to figure out how the network device indicates the terminal device to initiate the random access process in the secondary cell.

SUMMARY

In view of this, this application provides a communication method and an apparatus, to reduce a delay in initiating a random access process by a terminal device in a secondary cell.

According to a first aspect, an embodiment of this application provides a communication method. The communication method may be performed by a terminal device, or may be performed by a chip disposed in a terminal device. For example, the method is performed by a terminal device. The method includes:

The terminal device receives control information from a network device in a first cell, where the control information is used to indicate to initiate a random access process in a second cell, and the control information includes a first identifier of the second cell; and initiates, based on the control information, the random access process in the second cell by using a random access parameter associated with the first identifier.

By using the foregoing method, in one aspect, the terminal device is triggered, based on the control information received in the first cell, to initiate the random access process in the second cell, that is, trigger random access across cells. Compared with a method for triggering the random access process only by using a PDCCH order of the second cell, in the foregoing method, the network device does not need to wait until the second cell is activated before starting attempting to send the PDCCH order to the terminal device in the second cell. Instead, the network device can send the PDCCH order to the terminal device through the activated first cell. After the terminal device receives the PDCCH order, a process of activating the second cell and a random access preparation process in the second cell may be performed synchronously. In this way, the random access process may be initiated after the second cell is activated. This effectively reduces a delay in initiating the random access process by the terminal device in the secondary cell. In another aspect, the first identifier may be associated with the random access parameter of the second cell. Therefore, the terminal device may initiate the random access process in the second cell by using the random access parameter associated with the first identifier. In other words, the first identifier carried in the control information is an identifier of the second cell that can be associated with the random access parameter. Therefore, the first identifier does not need to be additionally configured. This can effectively save transmission resources, and facilitate implementation.

In this embodiment of this application, that the terminal device receives information (for example, the control information or other possible information) from the network device may alternatively be described as that the terminal device receives information sent by the network device.

In a possible design, the method further includes: receiving scheduling information from the network device in a third cell, where the scheduling information is used to schedule downlink data or uplink data of the second cell, the scheduling information includes a second identifier of the second cell, and the second identifier is different from the first identifier.

In a possible design, the method further includes: receiving configuration information from the network device, where the configuration information is used to indicate to schedule the downlink data or uplink data of the second cell in the third cell, and the configuration information includes the second identifier.

In a possible design, the second cell is in a deactivated state when the control information is received from the network device in the first cell.

In a possible design, the first identifier is configured when the network device adds or modifies the second cell.

In a possible design, one or more of the following fields in the control information are used to carry the first identifier: a first bit field or a reserved field.

In a possible design, the control information is scrambled by using a cell radio network temporary identifier (C-RNTI); or the control information is scrambled by using a downlink control channel order radio network temporary identifier (PO-RNTI).

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

According to a second aspect, an embodiment of this application further provides a communication method. The communication method may be performed by a network device, or may be performed by a chip disposed in a network device. For example, the method is performed by a network device. The method includes:

the network device obtains a first identifier of a second cell, where the first identifier is associated with a random access parameter of the second cell; and sends control information to a terminal device in a first cell, where the control information is used to indicate to initiate a random access process in the second cell, and the control information includes the first identifier of the second cell.

In a possible design, the method further includes: sending scheduling information to the terminal device in a third cell, where the scheduling information is used to schedule downlink data or uplink data of the second cell, the scheduling information includes a second identifier of the second cell, and the second identifier is different from the first identifier.

In a possible design, the method further includes: sending configuration information to the terminal device, where the configuration information is used to indicate to schedule the downlink data or uplink data of the second cell in the third cell, and the configuration information includes the second identifier.

In a possible design, the second cell is in a deactivated state when the control information is sent to the terminal device in the first cell.

In a possible design, the first identifier is configured when the second cell is added or modified.

In a possible design, one or more of the following fields in the control information are used to carry the first identifier: a first bit field or a reserved field.

In a possible design, the control information is scrambled by using a C-RNTI; or the control information is scrambled by using a PO-RNTI.

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

According to a third aspect, an embodiment of this application provides a communication method. The communication method may be performed by a terminal device, or may be performed by a chip disposed in a terminal device. For example, the method is performed by a terminal device. The method includes:

The terminal device receives control information from a network device in a first cell, where the control information is used to indicate to initiate a random access process in a second cell, and the control information includes a third identifier of the second cell; initiates the random access process in the second cell based on the control information; receives scheduling information from the network device in a third cell, where the scheduling information is used to schedule downlink data or uplink data of the second cell, the scheduling information includes a second identifier, and the second identifier is different from the third identifier; and transmits downlink data or uplink data in the second cell based on the scheduling information.

By using the foregoing method, in one aspect, the terminal device is triggered, based on the control information received in the first cell, to initiate the random access process in the second cell, that is, trigger random access across cells. Compared with a method for triggering a random access process only by using a PDCCH order of a local cell, in the foregoing method, the network device does not need to wait until the second cell is activated before starting attempting to send the PDCCH order to the terminal in the second cell. Instead, the network device can send the PDCCH order to the terminal through the activated first cell. After the terminal receives the PDCCH order, a process of activating the second cell and a random access preparation process in the second cell may be performed synchronously. In this way, the random access process may be initiated after the second cell is activated. This effectively reduces a delay in initiating the random access process by the terminal device in the secondary cell. In another aspect, the third identifier is different from the second identifier, that is, the control information in this embodiment of this application may not depend on cross-carrier scheduling. Therefore, when the network device has not configured cross-carrier scheduling for the second cell, random access may still be triggered across cells.

In a possible design, the method further includes: receiving first configuration information from the network device, where the first configuration information is used to indicate to monitor a first control channel of the second cell in the first cell, the first control channel is used to carry the control information, and the first configuration information includes the third identifier.

In a possible design, search space in which the first control channel of the second cell is located is the same as search space in which a control channel of the first cell is located.

In a possible design, the method further includes: receiving second configuration information from the network device, where the second configuration information is used to indicate to monitor a second control channel of the second cell in the third cell, the second control channel is used to carry the scheduling information, and the second configuration information includes the second identifier.

In a possible design, search space of the second control channel of the second cell is different from search space of a control channel of the third cell.

In a possible design, one or more of the following fields in the control information are used to carry the third identifier: a first bit field or a reserved field.

In a possible design, the control information is scrambled by using a C-RNTI; or the control information is scrambled by using a PO-RNTI.

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

According to a fourth aspect, an embodiment of this application provides a communication method. The communication method may be performed by a network device, or may be performed by a chip disposed in a network device. For example, the method is performed by a network device. The method includes:

The network device sends control information to a terminal device in a first cell, where the control information is used to indicate to initiate a random access process in a second cell, and the control information includes a third identifier of the second cell; and sends scheduling information to the terminal device in a third cell, where the scheduling information is used to schedule downlink data or uplink data of the second cell, the scheduling information includes a second identifier, and the second identifier is different from the third identifier.

In a possible design, the method further includes: sending first configuration information to the terminal device, where the first configuration information is used to indicate to monitor a first control channel of the second cell in the first cell, the first control channel is used to carry the control information, and the first configuration information includes the third identifier.

In a possible design, search space in which the first control channel of the second cell is located is the same as search space in which a control channel of the first cell is located.

In a possible design, the method further includes: sending second configuration information to the terminal device, where the second configuration information is used to indicate to monitor a second control channel of the second cell in the third cell, the second control channel is used to carry the scheduling information, and the second configuration information includes the second identifier.

In a possible design, search space in which the second control channel of the second cell is located is different from search space in which a control channel of the third cell is located.

In a possible design, one or more of the following fields in the control information are used to carry the third identifier: a first bit field or a reserved field.

In a possible design, the control information is scrambled by using a cell radio network temporary identifier (C-RNTI); or the control information is scrambled by using a PO-RNTI.

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

According to a fifth aspect, an embodiment of this application provides an apparatus. The apparatus has functions of the terminal device in implementing the first aspect or the third aspect. For example, the apparatus includes a corresponding module, unit, or means for performing the steps in the first aspect or the third aspect. The function, unit, or means may be implemented by software or hardware, or may be implemented by hardware executing corresponding software.

In a possible design, the apparatus includes a processing unit and a communication unit. Functions performed by the processing unit and the communication unit may correspond to the steps in the first aspect or the third aspect.

In a possible design, the apparatus includes a processor, and may further include a transceiver. The transceiver is configured to send and receive a signal, and the processor executes program instructions, to complete the method performed by the terminal device in any one of the possible designs or implementations in the first aspect to the third aspect.

The apparatus may further include one or more memories. The memory is configured to be coupled to the processor. The one or more memories may be integrated with the processor, or may be disposed independent of the processor. This is not limited in this application.

In a possible design, the memory stores computer program instructions and/or data that are necessary to implement the functions of the terminal device in the first aspect or the third aspect. The processor may execute the computer program instructions stored in the memory, to complete the method performed by the terminal device in any one of the possible designs or implementations in the first aspect to the third aspect.

According to a sixth aspect, an embodiment of this application provides an apparatus. The apparatus has functions of the network device in implementing the second aspect or the fourth aspect. For example, the apparatus includes a corresponding module, unit, or means of the network device for performing the steps in the second aspect or the fourth aspect. The function, unit, or means may be implemented by software or hardware, or may be implemented by hardware executing corresponding software.

In a possible design, the apparatus includes a processing unit and a communication unit. Functions performed by the processing unit and the communication unit may correspond to the steps performed by the network device in the second aspect or the fourth aspect.

In a possible design, the apparatus includes a processor, and may further include a transceiver. The transceiver is configured to send and receive a signal. The processor executes program instructions, to complete the method performed by the network device in any one of the possible designs or implementations in the second aspect or the fourth aspect.

The apparatus may further include one or more memories. The memory is configured to be coupled to the processor. The one or more memories may be integrated with the processor, or may be disposed independent of the processor. This is not limited in this application.

In a possible design, the memory stores computer program instructions and/or data that are necessary to implement the functions of the network device in the second aspect or the fourth aspect. The processor may execute the computer program instructions stored in the memory, to complete the method performed by the network device in any one of the possible designs or implementations in the second aspect or the fourth aspect.

According to a seventh aspect, an embodiment of this application provides a computer-readable storage medium. The computer storage medium stores computer-readable instructions, and when a computer reads and executes the computer-readable instructions, the computer is enabled to perform the method according to any one of the first aspect or the possible designs of the fourth aspect.

According to an eighth aspect, an embodiment of this application provides a computer program product. When a computer reads and executes the computer program product, the computer is enabled to perform the method in any one of the possible designs in the first aspect to the fourth aspect.

According to a ninth aspect, an embodiment of this application provides a chip. The chip is connected to a memory, and is configured to read and execute a software program stored in the memory, to implement the method in any one of the possible designs in the first aspect to the fourth aspect.

According to a tenth aspect, an embodiment of this application provides a communication system, including the terminal device in any one of the possible designs in the first aspect or the third aspect and the network device in any one of the possible designs in the second aspect or the fourth aspect.

DESCRIPTION OF EMBODIMENTS

Figure 1A:
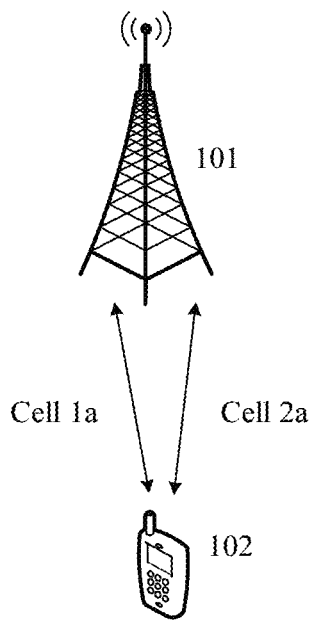
FIG. 1a is a schematic diagram of a possible system architecture to which an embodiment of this application is applicable.

The following describes the technical solutions in embodiments of the present invention with reference to the accompanying drawings in the embodiments of the present invention. It is clear that the described embodiments are merely a part rather than all of the embodiments of the present invention.

Some terms in the embodiments of this application are first described, to help a person skilled in the art have a better understanding.

(1) A terminal device is a device with a wireless transceiver function. The terminal device may be deployed on land, including indoor, outdoor, handheld, or vehicle-mounted devices. The terminal device may alternatively be deployed on the water (for example, on a ship); or may be deployed in the air (for example, on an airplane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (sSIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (t5G) network, a terminal device in a future evolved public land mobile network (PLMN), or the like. The terminal device sometimes may also be referred to as a terminal device, user equipment (UE), an access terminal device, a vehicle-mounted terminal device, an industrial control terminal device, a UE unit, a UE station, a mobile station, a remote station, a remote terminal device, a mobile device, a UE terminal device, a terminal device, a wireless communication device, a UE agent, a UE apparatus, or the like. The terminal device may be fixed or movable. This is not limited in the embodiments of this application.

In some embodiments of this application, the apparatus configured to implement a function of the terminal device may be a terminal device, or may be an apparatus that can support the terminal device in implementing the function, for example, a chip system. The apparatus may be disposed in the terminal device. In the embodiments of this application, the chip system may include a chip, or may include a chip and another discrete component. In the technical solutions provided in the embodiments of this application, the technical solutions provided in the embodiments of this application are described by using an example in which an apparatus for implementing a function of the terminal is the terminal device.

(2) A network device may be an access network device. The access network device may also be referred to as a radio access network (RAN) device, and is a device that provides a wireless communication function for a terminal device. For example, the access network device includes but is not limited to: a next-generation base station (gNB) in 5G, an evolved NodeB (eNB), a radio network controller (RNC), a NodeB (NB), a base station controller (BSC), a base transceiver station (BTS), a home base station (for example, a home evolved nodeB or a home nodeB, HNB), a baseband unit (BBU), a transmission reception point (TRP), a transmission point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of access network devices using different technologies. For example, the terminal device may communicate with an access network device supporting long term evolution (LTE), may communicate with an access network device supporting 5G, or may implement dual connectivity with an access network device supporting LTE and an access network device supporting 5G. This is not limited in the embodiments of this application.

In the embodiments of this application, an apparatus configured to implement a network device function may be a network device, or may be an apparatus, for example, a chip system, that can support the network device in implementing the function. The apparatus may be mounted in the network device. In the technical solutions provided in the embodiments of this application, an example in which the apparatus for implementing a network device function is a network device may be used to describe the technical solutions provided in the embodiments of this application.

(3) Carrier aggregation (CA): CA means aggregating a plurality of component carriers (CC) to serve one terminal device. Actually, each downlink component carrier corresponds to an independent cell. Generally, one downlink component carrier may be equivalent to one cell. Therefore, carrier aggregation may also be referred to as cell aggregation.

A plurality of aggregated cells include one primary cell. The primary cell may be a cell in which the terminal device performs initial connection establishment. Alternatively, the primary cell may be a cell in which the terminal device performs RRC connection reestablishment. Alternatively, the primary cell may be a primary cell specified in a handover process. The primary cell is mainly used for RRC communication with the terminal device. A component carrier corresponding to the primary cell is referred to as a primary component carrier (PCC). A downlink carrier of the primary component carrier is referred to as a downlink primary component carrier (downlink PCC, DL PCC), and an uplink carrier of the primary component carrier is referred to as an uplink primary component carrier (uplink PCC, UL PCC).

A plurality of aggregated cells include one or more secondary cells. The secondary cell may be a cell without RRC communication with the terminal device, and is mainly used to provide additional radio resources. The secondary cell may be added during RRC reconfiguration. A component carrier corresponding to the secondary cell is referred to as a secondary component carrier (SCC). A downlink carrier of the secondary component carrier is referred to as a downlink secondary component carrier (downlink SCC, DL SCC), and an uplink carrier of the secondary component carrier is referred to as an uplink secondary component carrier (uplink SCC, UL SCC).

For example, the primary cell may be determined during connection establishment, and the secondary cell may be added, modified, or released by using an RRC connection reconfiguration message after initial access is completed.

(4) Dual connectivity (DC): The terminal device can be connected to two network devices at the same time. This connection manner is referred to as DC. One network device is a primary network device, and the other network device is a secondary network device. The master network device may also be referred to as a master node (MN), and the secondary network device may also be referred to as a secondary node (SN). In the embodiments of this application, the primary network device is one of an LTE network device (for example, an eNB), a 5G network device (for example, a gNB), or a future communication network device, and the secondary network device is also one of an LTE network device, a 5G network device, or a future communication network device. In addition, the primary network device and the secondary network device may be network devices of a same standard, for example, both are eNBs; or may be network devices of different standards. For example, the primary network device is an eNB, and the secondary network device is a gNB. Communication standards of the primary network device and the secondary network device are not limited in this application.

For example, a cell group managed by the primary network device is referred to as a master cell group (MCG), and a cell group managed by the secondary network device is referred to as a secondary cell group (SCG). The MCG may include one or more cells. In a case of a plurality of cells, the cells may serve the terminal device in CA mode. In other words, the MCG may include one primary cell or additionally include one or more secondary cells. The SCG may include one or more cells. In a case of a plurality of cells, the cells may serve the terminal device in CA mode. In other words, the SCG may include one primary secondary cell (PSCell) or additionally include one or more secondary cells.

(5) Control channel: The control channel in the embodiments of this application may be a downlink control channel, for example, a physical downlink control channel (PDCCH), an enhanced physical downlink control channel (ePDCCH), or another possible downlink control channel. This is not specifically limited. In the embodiments of this application, an example in which the control channel is the PDCCH is mainly used for description.

(6) Cell and carrier: Each downlink carrier (component) corresponds to one independent cell, or one cell includes only one downlink carrier. Generally, one downlink carrier may be equivalent to one cell. For example, one cell may include only one downlink carrier, or may include one downlink carrier and one uplink carrier, or may include one downlink carrier and two uplink carriers. In the embodiments of this application, concepts of the carrier and the cell are interchangeable.

(7) A serving cell may be a cell that provides uplink and downlink transmission services for the terminal device. If the terminal device is in RRC connected mode but no CA is configured, the terminal device has only one serving cell, and the serving cell may be a primary cell. If the terminal device is in RRC connected mode and CA is configured, the terminal device may include a serving cell group, and the serving cell group includes a primary cell and a secondary cell. It may be understood that, in the embodiments of this application, the serving cell may indicate a primary cell or a secondary cell, or the serving cell may indicate both a primary cell and a secondary cell, and so on.

(8) Frequency range 1 (FR 1) and frequency range 2 (FR 2):

As shown in Table 1, in an NR protocol, frequencies used for 5G communication are classified into the FR 1 and the FR 2 based on ranges. The FR 1 ranges from 450 MHz to 6000 MHz, that is, corresponds to a low frequency band. The FR 2 ranges from 24250 MHz to 52600 MHz, that is, corresponds to a high frequency band. Channel bandwidths may be different within different FRs. Because the high frequency band has abundant resources, a channel bandwidth of the high frequency band is generally large.

TABLE 1

| Definitions of frequency ranges | |
|---|---|
| Frequency range designation | Corresponding frequency range |
| FR 1 | 450 MHz to 6000 MHz |
| FR 2 | 24250 MHz to 52600 MHz |

(9) BWP: In a 5G communication system, to adapt to a bandwidth capability of the terminal device, a BWP may be configured for the terminal device within a carrier-supported bandwidth (which may be referred to as a carrier bandwidth, and may be specifically 10 MHz, 15 MHz, 20 MHz, 50 MHz, 100 MHz, 400 MHz, or the like). A plurality of BWPs may be configured over one carrier. For example, four BWPs may be configured over one carrier. The BWP may also be sometimes referred to as a carrier bandwidth part, a subband bandwidth, a narrowband bandwidth, or another name. The name is not limited in this application. For ease of description, an example in which the name is the BWP is used for description. For example, one BWP includes K (K>0) subcarriers. Alternatively, one BWP is a frequency domain resource in which N non-overlapping RBs are located, and a subcarrier spacing of the RBs may be 15 kHz, 30 kHz, 60 kHz, 120 kHz, 240 kHz, 480 kHz, or another value. Alternatively, one BWP is a frequency domain resource in which M non-overlapping resource block groups (RBGs) are located. For example, one RBG includes P (P>0) contiguous RBs, and a subcarrier spacing (SCS) of the RBs may be 15 kHz, 30 kHz, 60 kHz, 120 kHz, 240 kHz, 480 kHz, or another value, for example, an integer multiple of 2.

If a cell (carrier) includes one or more BWPs, the network device may activate at least one of the BWPs for the terminal device to perform communication. The terminal device and the network device perform data communication on the activated BWP. For simplified description, an example in which only one BWP is activated is used for description in the embodiments of this application. For example, after the BWP is introduced, that "a terminal device receives, in a first cell, control information sent by a network device, where the control information is used to indicate to initiate a random access process in a second cell" in the embodiments of this application may be understood as follows: "The terminal device receives, on an activated BWP in the first cell, the control information sent by the network device, where the control information is used to indicate to initiate a random access process on the activated BWP in the second cell."

(10) The terms "system" and "network" may be used interchangeably in the embodiments of this application. "At least one" means one or more, and "a plurality of" means two or more. "And/or" describes an association between associated objects, and indicates that three relationships may exist. For example, A and/or B may indicate the following cases: A exists alone, both A and B exist, and B exists alone, where A and B may be singular or plural. The character "/" usually represents an "or" relationship between the associated objects. The term "at least one of the following items (pieces)" or a similar expression thereof means any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, and not used to limit an order, a time sequence, priorities, or importance of the plurality of objects. For example, first information and second information are merely used to distinguish different pieces of information, but do not indicate different priorities, importance degrees, and the like of the two pieces of information.

FIG. 1a is a schematic diagram of a possible system architecture to which an embodiment of this application is applicable. The system architecture shown in FIG. 1a includes a network device 101 and a terminal device 102. The network device 101 provides a plurality of cells (such as a cell 1a and a cell 2a), and the plurality of cells serve the terminal device 102 in CA mode. In other words, the system architecture shown in FIG. 1a may be understood as a CA architecture.

Figure 1B:
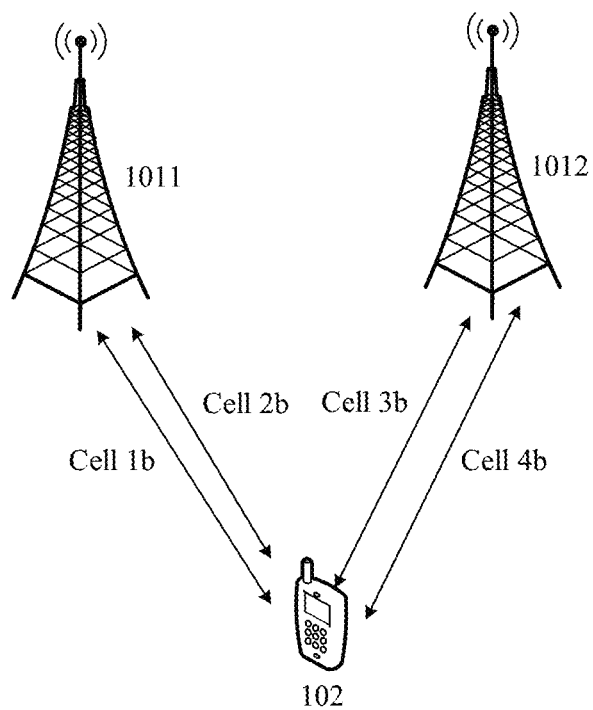
FIG. 1b is a schematic diagram of another possible system architecture to which an embodiment of this application is applicable.

FIG. 1b is a schematic diagram of another possible system architecture to which an embodiment of this application is applicable. The system architecture shown in FIG. 1b includes a network device 1011, a network device 1012, and a terminal device 102. The network device 1011 and the network device 1012 jointly serve the terminal device 102. The network device 1011 is a primary network device, and the network device 1012 is a secondary network device. Alternatively, the network device 1011 is a secondary network device, and the network device 1012 is a primary network device. This is not specifically limited. In other words, the system architecture shown in FIG. 1b may be understood as a DC architecture.

Further, the network device 1011 may provide a plurality of cells (such as a cell 1b and a cell 2b), and the plurality of cells serve the terminal device 102 in CA mode. The network device 1012 may also provide a plurality of cells (such as a cell 3b and a cell 4b), and the plurality of cells serve the terminal device 102 in CA mode. In this case, the system architecture shown in FIG. 1b may be understood as a DC+CA architecture.

For the system architectures shown in FIG. 1a and FIG. 1b, it should be understood that a quantity of network devices and a quantity of terminal devices in the system architecture are not limited in the embodiments of this application. In addition, the system architecture to which the embodiments of this application are applicable may further include other devices such as a core network device, a wireless relay device, and a wireless backhaul device in addition to the network device and the terminal device. This is not limited in this embodiment of this application. In addition, the network device in the embodiments of this application may integrate all functions into one independent physical device, or may distribute the functions on a plurality of independent physical devices. This is not limited in the embodiments of this application either. In addition, the terminal device in the embodiments of this application may be connected to the network device in a wireless manner.

The system architecture illustrated above is applicable to various communication systems using a radio access technology (RAT), for example, a 5G communication system and a future communication system. The system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of a communication system architecture and emergence of a new service scenario, the technical solutions provided in the embodiments of this application are also applicable to similar technical problems.

The system architecture shown in FIG. 1a is used as an example. The network device 101 may communicate with the terminal device in the cell Ta or the cell 1b. The cell Ta may be a primary cell, and the cell Tb may be a secondary cell. Alternatively, the cell 1a may be a secondary cell, and the cell Tb may be a primary cell. For example, the cell 1a is the primary cell and the cell Tb is the secondary cell. In this case, the cell 1a and the cell Tb may be understood as serving cells of the terminal device 102.

For example, the network device 101 adds a new secondary cell (for example, a cell 1c) to the terminal device 102. The newly added secondary cell may be in a deactivated state, and may be used for data communication after being activated subsequently. In this embodiment of this application, the deactivated state may also be understood as an inactive state or a non-active state.

In a possible scenario (which is referred to as a scenario 1), the cell 1c may be a low-frequency cell. If an uplink TA of the cell 1c (in this case, the cell 1c may be in a deactivated state) and an uplink TA of another serving cell of the terminal device do not belong to a same TA group, the network device 101 may indicate the terminal device 102 to initiate a random access process in the cell 1c. However, random access of the secondary cell may be triggered by using a PDCCH order sent on a PDCCH, for example, triggered by using a PDCCH order of a local cell. Therefore, the network device may send the PDCCH order to the terminal device in the cell 1c, to trigger the terminal device 102 to perform the random access process in the cell 1c. In this case, the terminal device can monitor the PDCCH in the activated cell 1c only after the cell 1c is activated, to obtain the PDCCH order and initiate the random access process. However, secondary cell activation may include a plurality of processes such as cell search, downlink synchronization, CSI measurement, and CSI reporting. As a result, a delay in initiating the random access process by the terminal device in the cell 1c is relatively long, and resource use efficiency of the secondary cell is reduced.

In another possible scenario (which is referred to as a scenario 2), the cell 1c may be a high-frequency cell, and the cell 1a and the cell 1b may be low-frequency cells. As an example, the high-frequency cell may be a cell located within the FR 2, and the low-frequency cell may be a cell located within the FR 1. The cell 1c is a high-frequency cell, of which an activation process needs to additionally consider alignment of transmit and receive beams. The random access process can be initiated only after the cell is activated. This further increases a delay in initiating the random access process by the terminal device in the secondary cell. Consequently, a delay in initiating the random access process by the terminal device in the cell 1c is relatively long.

In view of this, an embodiment of this application provides a communication method, to reduce a delay in initiating a random access process by a terminal device in a secondary cell. In the following descriptions, an example in which the method provided in this embodiment of this application is applied to the system architecture shown in FIG. 1a is used. In addition, the method may be performed by two communication apparatuses. The two communication apparatuses are, for example, a first communication apparatus and a second communication apparatus. The first communication apparatus may be a network device or a communication apparatus that can support the network device in implementing functions needed for the method, and certainly may alternatively be another communication apparatus such as a chip or a chip system. The second communication apparatus may be a terminal device or a communication apparatus that can support the terminal device in implementing functions needed for the method, and certainly may alternatively be another communication apparatus such as a chip or a chip system. For ease of description, the following uses an example in which the method is performed by a network device and a terminal device, that is, an example in which the first communication apparatus is the network device and the second communication apparatus is the terminal device. If this embodiment is applied to the system architecture shown in FIG. 1a, the network device described below (for example, a network device configured to perform an embodiment shown in FIG. 2a or FIG. 3) may be the network device in the system architecture shown in FIG. 1a, and a terminal device described below (for example, a terminal device configured to perform the embodiment shown in FIG. 2a or FIG. 3) may be the terminal device in the system architecture shown in FIG. 1a.

In an example, the communication method provided in this embodiment of this application may include two possible solutions, which are referred to as Solution 1 and Solution 2 for ease of description.

In Solution 1, the terminal device receives, in a first cell, control information 1 sent by the network device, where the control information 1 is used to indicate to initiate a random access process in a second cell, and the control information 1 includes a first identifier of the second cell; and initiates the random access process in the second cell based on the control information 1. In this way, in one aspect, the terminal device is triggered, based on the control information 1 received in the first cell, to initiate the random access process in the second cell, that is, trigger random access across cells. Compared with a method for triggering the random access process only by using a PDCCH order of the second cell, in Solution 1, the network device does not need to wait until the second cell is activated before starting attempting to send the PDCCH order to the terminal device in the second cell. Instead, the network device can send the PDCCH order to the terminal device through the activated first cell. After the terminal device receives the PDCCH order, a process of activating the second cell and a random access preparation process in the second cell may be performed synchronously. In this way, the random access process may be initiated after the second cell is activated. This effectively reduces a delay in initiating the random access process by the terminal device in the secondary cell. In another aspect, the first identifier may be associated with a random access parameter of the second cell. Therefore, the terminal device may initiate the random access process in the second cell by using the random access parameter associated with the first identifier. In other words, the first identifier carried in the control information is an identifier of the second cell that can be associated with the random access parameter. Therefore, the first identifier does not need to be additionally configured. This can effectively save transmission resources, and facilitate implementation.

In Solution 2, the terminal device receives, in a first cell, control information 2 sent by the network device, where the control information 2 is used to indicate to initiate a random access process in a second cell, and the control information 2 includes a third identifier of the second cell. Further, the terminal device initiates the random access process in the second cell based on the control information 2. Then, the terminal device receives, in a third cell, scheduling information sent by the network device, where the scheduling information is used to schedule downlink data or uplink data of the second cell, the scheduling information includes a second identifier, and the second identifier is different from the third identifier. Then, the terminal device transmits downlink data or uplink data in the second cell based on the scheduling information. In this way, in one aspect, the terminal device is triggered, based on the control information 2 received in the first cell, to initiate the random access process in the second cell, that is, trigger random access across cells. Compared with a method for triggering a random access process only by using a PDCCH order of a local cell, in Solution 2, the network device does not need to wait until the second cell is activated before starting attempting to send the PDCCH order to the terminal in the second cell. Instead, the network device can send the PDCCH order to the terminal through the activated first cell. After the terminal receives the PDCCH order, a process of activating the second cell and a random access preparation process in the second cell may be performed synchronously. In this way, the random access process may be initiated after the second cell is activated. This effectively reduces a delay in initiating the random access process by the terminal device in the secondary cell. In another aspect, the third identifier is different from the second identifier, that is, the control information 2 in this embodiment of this application may not depend on cross-carrier scheduling. Therefore, when the network device has not configured cross-carrier scheduling for the second cell, random access may still be triggered across cells.

Figure 2A:
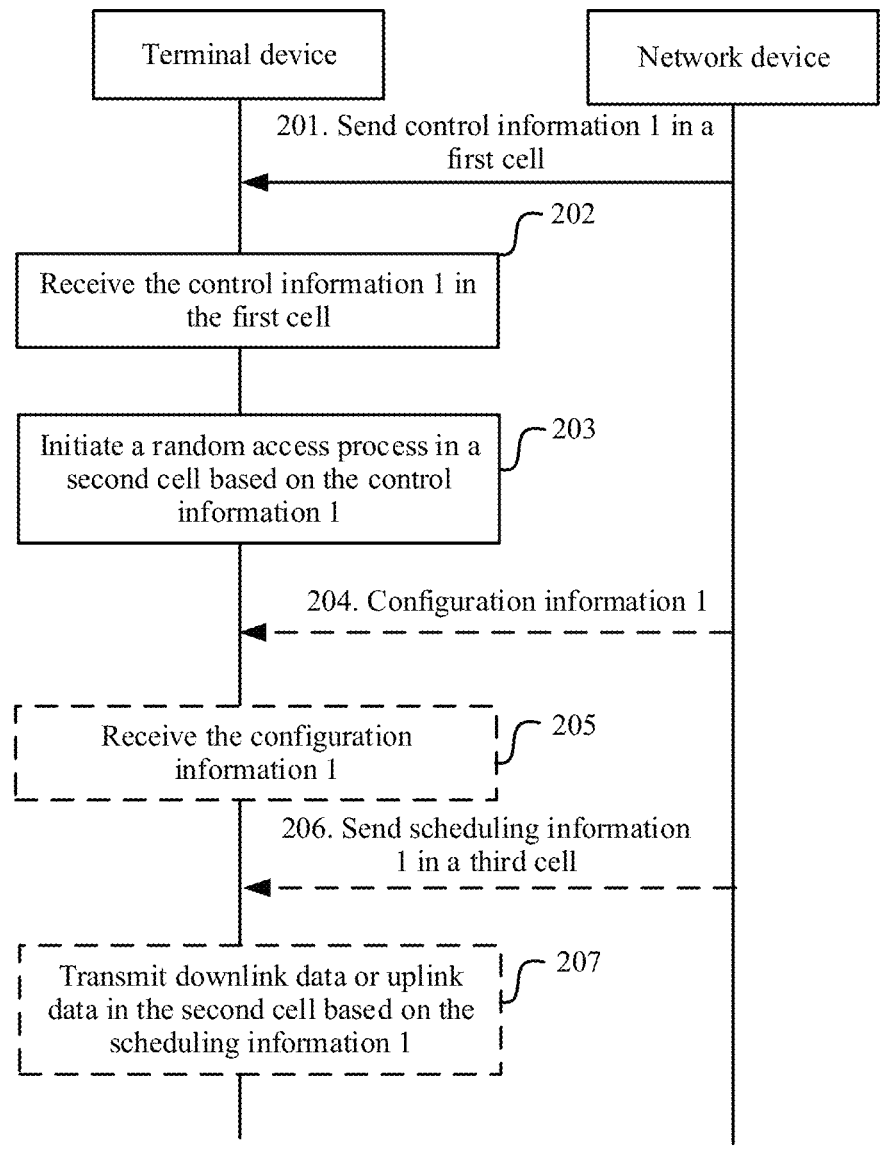
FIG. 2a is a schematic flowchart corresponding to a communication method of Solution 1 according to an embodiment of this application.

FIG. 2a is a schematic flowchart corresponding to a communication method of Solution 1 according to an embodiment of this application. As shown in FIG. 2a, the method includes the following steps.

Step 201: A network device sends control information 1 to a terminal device in a first cell. The control information 1 is used to indicate to initiate a random access process in a second cell, and the control information 1 includes a first identifier of the second cell.

For example, the network device may first obtain the first identifier of the second cell, generate the control information 1, and send the control information 1 to the terminal device in the first cell.

Correspondingly, in step 202, the terminal device receives, in the first cell, the control information 1 sent by the network device.

Step 203: The terminal device initiates the random access process in the second cell based on the control information 1.

Herein, the network device may provide a plurality of cells, which may include the first cell, the second cell, and a third cell, and may further include another possible cell. For example, the first cell and the third cell may be serving cells of the terminal device. In other words, the first cell (or the third cell) may be a primary cell or may be a secondary cell in an activated state. The second cell may be a secondary cell added or modified by the network device for the terminal device.

The following describes the first identifier of the second cell.

For example, the terminal device may initiate the random access process in the second cell by using a random access parameter associated with the first identifier. The random access parameter associated with the first identifier may be understood as a random access parameter in the second cell associated with the first identifier, or a parameter used by the terminal device to initiate the random access process in the second cell. For example, the random access parameter may include one or more of the following: a subcarrier spacing of a random access channel (RACH), a correspondence between a synchronization signal block (SSB) and a RACH sending moment, a window length of a RACH response, and a parameter of an uplink BWP at which the RACH is sent. The first identifier is an identifier of the second cell that can be associated with the random access parameter (for example, a cell index of the second cell or a cell identifier (cell ID) of the second cell). This means that an existing identifier of the second cell that is associated with the random access parameter may be directly used as the first identifier. This facilitates implementation.

In this embodiment of this application, an identifier (for example, the cell index or the cell identifier of the second cell) configured by the network device for the second cell added or modified for the terminal device can generally be associated with all configuration information of the second cell, for example, the random access parameter of the second cell. Therefore, the first identifier of the second cell may also be understood as the identifier configured by the network device for the second cell added or modified for the terminal device.

For example, that the network device adds a secondary cell (for example, the second cell) for the terminal device is described as follows: A CA scenario is used as an example. When a large amount of service data needs to be transmitted between the network device and the terminal device, or resources of a current serving cell of the terminal device are insufficient, the network device may add a secondary cell for the terminal device. For example, the network device may determine, based on a measurement report reported by the terminal device, QoS information, and a load status of the network device, whether to add a secondary cell for the terminal device. When determining to add a secondary cell for the terminal device, the network device may send an RRC reconfiguration command to the terminal device, where the RRC reconfiguration command may include an identifier of a newly added secondary cell (for example, the first identifier of the second cell). Correspondingly, the terminal device may learn the newly added secondary cell according to the RRC reconfiguration command.

That the network device modifies a secondary cell (for example, changes the third cell to the second cell) for the terminal device is described as follows: The CA scenario is used as an example. The third cell is a serving cell of the terminal device. If the network device determines that channel quality of the second cell is better than channel quality of the third cell, the network device may modify the secondary cell. For example, the network device may determine, based on a measurement report reported by the terminal device, whether a cell with better channel quality than the current serving cell of the terminal device exists. If yes, the secondary cell may be modified. When determining to modify the secondary cell for the terminal device, the network device may send an RRC reconfiguration command to the terminal device, where the RRC reconfiguration command may include an identifier of a modified secondary cell (for example, the first identifier of the second cell). Correspondingly, the terminal device may learn the modified secondary cell according to the RRC reconfiguration command.

It should be noted that, the foregoing descriptions of adding or modifying the secondary cell by the network device for the terminal device are merely some possible implementations. For a specific procedure, refer to the conventional technology. Details are not described herein again.

For example, a value of the first identifier may be a serving cell index value configured by the network device for the terminal device in the CA scenario or a DC scenario. The value may be servCellIndex in SpCellConfig IE, or may be sCellIndex in SCellConfig IE.

A possible structure of SpCellConfig IE is described as follows:

```
SpCellConfig ::=   SEQUENCE {
  servCellIndex    ServCellIndex OPTIONAL,  -- Cond SCG
  reconfigurationWithSync  ReconfigurationWithSync OPTIONAL,
  -- Cond ReconfWithSync
  rlf-TimersAndConstants   SetupRelease { RLF-TimersAndConstants }
  OPTIONAL,  -- Need M
  rlmInSyncOutOfSyncThreshold  ENUMERATED {n1}
  OPTIONAL,  -- Need S
  spCellConfigDedicated  ServingCellConfig OPTIONAL,
  -- Need M
  ...
}
```

A possible structure of ServCellIndex IE in SpCellConfig IE is described as follows:

```
-- ASN1START
-- TAG-SERVCELLINDEX-START
ServCellIndex ::=           INTEGER (0..maxNrofServingCells-1)
-- TAG-SERVCELLINDEX-STOP
-- ASN1STOP
```

A constant maxNrofServingCells INTEGER::=32—Max number of serving cells (SpCells+SCells)

servCellIndex in SpCellConfig IE is a short identifier of a cell, and is used by the terminal device to identify a serving cell. For example, servCellIndex may represent a cell index of a PSCell, and is used for configuring the PSCell. ServCellIndex represents a cell index of the serving cell (including a PCell, a PSCell, or an SCell), and a value range of ServCellIndex is 0 to N−1. N represents a maximum quantity of cells that can be configured in the CA scenario or the DC scenario. For example, if N=32, a maximum of 32 cells can be configured. A cell index of the PCell in an MCG is 0. reconfigurationWithSync is used for reconfiguration with synchronization of target SpCells (including the PCell and the PSCell), and is mainly used in a cell handover scenario.

A possible structure of SCellConfig IE is described as follows:

```
SCellConfig ::=              SEQUENCE {
  sCellIndex                 SCellIndex,
  sCellConfigCommon          ServingCellConfigCommon
    OPTIONAL,  -- Cond SCellAdd
  sCellConfigDedicated       ServingCellConfig
  OPTIONAL,  -- Cond SCellAddMod
  ...,
  [[
  smtc                       SSB-MTC
    OPTIONAL  -- Need S
  ]]
}
```

A possible structure of sCellIndex in SCellConfig IE is described as follows:

```
-- ASN1START
-- TAG-SCELLINDEX-START
SCellIndex ::=            INTEGER (1..31)
-- TAG-SCELLINDEX-STOP
-- ASN1STOP
```

The foregoing SCellConfig IE is an information element for configuring the SCell. sCellIndex in SCellConfig IE is a short identifier of a cell, and is used by the terminal device to identify the SCell or the PSCell. For example, sCellIndex represents a cell index of the SCell. A value of sCellIndex is used to identify the SCell, and ranges from 1 to N−1, where N represents a maximum quantity of cells that can be configured in the CA/DC scenario. For example, if N=32, a maximum of 32 cells can be configured. A value ServingCellConfigCommon IE of sCellConfigCommon includes indications of downlink carrier and uplink carrier frequencies of a cell, and configurations of a cell-level bandwidth part (BWP), such as initialDownlinkBWP and initialUplinkBWP. The initialUplinkBWP includes a frequency position of the sent RACH and a configuration of RACH-ConfigCommon, and is used to indicate the terminal device to initiate a random access process in the cell.

The following describes the control information 1.

For example, the control information 1 may be DCI. One or more of the following fields in the control information 1 are used to carry the first identifier: a newly extended first bit field or a reserved field. A quantity of bits included in the first identifier may be related to a maximum quantity of cells that can be configured. For example, if the maximum quantity of cells that can be configured is 32, the value of the first identifier may range from 1 to 31, and the first identifier may include five bits. For example, the maximum quantity of cells that can be configured is 16, and the first identifier may include four bits. In another possible example, the first identifier may further include another quantity of bits. This is not specifically limited.

When the control information is DCI, the control information 1 may be scrambled by using a cell radio network temporary identifier (C-RNTI), or may be scrambled by using a non-C-RNTI, for example, a random access radio network temporary identifier (RA-RNTI). Alternatively, the control information 1 is scrambled by using a newly defined RNTI. The newly defined RNTI may be referred to as a downlink control channel order radio network temporary identifier (PDCCH order RNTI, PO-RNTI).

In this embodiment of this application, that the control information 1 is scrambled by using the C-RNTI or a non-C-RNTI may be understood as that CRC in the control information 1 is scrambled by using the C-RNTI or a non-C-RNTI. The following briefly describes a process of encoding the DCI to illustrate a case in which the DCI is scrambled by using the C-RNTI (that the DCI is scrambled by using the C-RNTI is used as an example herein. When the DCI is scrambled by using a non-C-RNTI, reference may be made to the case of scrambling by using the C-RNTI). The process of encoding the DCI includes the following steps: Step 1: Generate an information block (or referred to as an information sequence, for example, $a_0, a_1, a_2, a_3, \ldots, a_{A-1}$) by combining information bits in a specific format (a DCI format). Step 2: Generate CRC check information $p_0, p_1, p_2, p_3, \ldots, p_{L-1}$ based on the information block $a_0, a_1, a_2, a_3, \ldots, a_{A-1}$, and attach the CRC check information to the information block to generate $b_0, b_1, b_2, b_3, \ldots, b_{K-1}$, where $b_k=a_k$, for $k=0, 1, 2, \ldots, A-1$; $b_k=p_{k-A}$, for $k=A, A+1, A+2, \ldots, A+L-1$; and $K=A+L$. Step 3: Scramble the CRC check information by using a C-RNTI (for example, $x_{rnti,0}, x_{rnti,1}, \ldots, x_{rnti,15}$) after attachment, to generate an information sequence $c_0, c_1, c_2, c_3, \ldots, c_{K-1}$. For example, the following operations may be performed: $c_k=b_k$, for $k=0, 1, 2, \ldots, A+7$; $c_k=(b_k+x_{rnti,k-A-8})\bmod 2$, for $k=A+8, A+9,$ A+10, . . . , A+23. Step 4: Perform channel encoding and rate matching, and complete an encoding process, to obtain encoded DCI.

The control information 1 may be DCI in a plurality of possible formats such as a DCI format 0_0, a DCI format 0_1, a DCI format 1_0, or a DCI format 1_1. The DCI may include one or more of the following: a hybrid automatic repeat request (HARQ) process number indicator field, a redundancy version (RV) indicator field, a modulation and coding scheme (MCS) indicator field, a frequency domain resource assignment (indicator field, a time domain resource assignment indicator field, a new data indicator (NDI) field, a transmit power control (TPC) indicator field (which may be TPC of a PUSCH or TPC of a PUCCH), a frequency hopping (flag) indicator field, or the reserved field.

Further, the control information 1 may include indication information, and the indication information is used to indicate that the control information 1 is signaling used to trigger random access, for example, a PDCCH order. The HARQ process number indicator field, the RV indicator field, the MCS indicator field, the frequency domain resource assignment indicator field, the time domain resource assignment indicator field, the new data indicator field, the transmit power control indicator field, and the like are all used to indicate corresponding information when uplink data or downlink data transmission is scheduled. For example, when the DCI format 1_0 is used to schedule downlink data, the frequency domain resource assignment indicator field is used to indicate a frequency domain resource occupied by the downlink data. When the DCI is a PDCCH order, the DCI is no longer used to schedule uplink data or downlink data. Therefore, the indication information may be carried by using the foregoing fields. In an example, one or more of the following fields may be used to carry the indication information: the HARQ number indicator field, the RV indicator field, the MCS indicator field, the frequency domain resource assignment indicator field, the time domain resource assignment indicator field, the new data indicator field, the transmit power control indicator field, a newly extended second bit field, or the reserved field. It may be understood that the indication information may alternatively be carried by using another possible field. This is not limited in this embodiment of this application. It should be noted that, when the control information 1 is scrambled by using a non-C-RNTI, for example, a PO-RNTI, the control information 1 may alternatively not include the indication information, because the PO-RNTI may indicate that the control information 1 is a PDCCH order.

An example in which the control information 1 is in the DCI format 1_0 scrambled by using the C-RNTI is used. Table 2 shows example fields included in the control information 1.

TABLE 2

Example fields included in the control information 1

| Field | Quantity of bits | Description |
| --- | --- | --- |
| Identifier for DCI formats | 1 | Downlink data scheduling indicator field |
| Frequency domain resource assignment | Variable | Frequency domain resource assignment indication |
| Random Access Preamble index | 6 | Random access sequence indicator field |
| UL/SUL indicator | 1 | Random access carrier indicator field |

TABLE 2-continued

Example fields included in the control information 1

| Field | Quantity of bits | Description |
| --- | --- | --- |
| SS/PBCH index | 6 | Synchronization signal block (SSB) index indicator field |
| PRACH Mask index | 4 | RACH timing indicator field associated with the SSB index |
| Cell index | 4 or 5 | Cell index indicator field |
| Reserved bits | 6 or 5 | Reserved field |

Based on Table 2, when detecting that information of the frequency domain resource assignment indicator field in the DCI format 1_0 format scrambled by using the C-RNTI is all '1', the terminal device determines that the control information 1 is a PDCCH order. In addition, the terminal device detects that a cell indicated by the cell index in the DCI format 1_0 format scrambled by using the C-RNTI is the second cell, and may further initiate the random access process in the second cell.

In this embodiment of this application, to avoid increasing a quantity of PDCCH blind detections of the UE, a size of the control information 1 may be aligned with a size of an original DCI format. For example, when the DCI format 1_0 is used to send PDCCH order indication information, a size of the DCI format 1_0 may be consistent with a size of the DCI format 1_0 used for scheduling downlink data.

In an example, when the network device sends the control information to the terminal device or the terminal device receives the control information from the network device, the second cell may be in a deactivated state (for example, the foregoing scenario 1 and scenario 2). In this case, the method in this embodiment of this application is used. According to the method, the network device may send a PDCCH order to the terminal device in the activated first cell, to trigger the terminal device to initiate the random access process in the second cell. This can effectively reduce a delay in initiating the random access process by the terminal device in the second cell. In another example, when the network device sends the control information to the terminal device or the terminal device receives the control information from the network device, the second cell may be in an activated state (which may be referred to as a scenario 3). When the second cell is in an activated state, the terminal device may alternatively monitor a PDCCH of the second cell in another cell (for example, the first cell) to reduce power consumption. In this way, when uplink out-of-synchronization occurs in the second cell, the terminal device may receive a PDCCH order of the second cell in the first cell, and is triggered to initiate the random access process in the second cell to complete uplink synchronization.

It may be understood that the solution described in this embodiment of this application is not limited to the above described scenario 1, scenario 2, and scenario 3, but may be further applicable to other possible scenarios.

For example, the method may further include step 204 to step 207. Step 204 to step 207 are described by using an example in which the second cell is scheduled across cells. In another possible embodiment, cross-cell scheduling may not be performed, but data transmission of the second cell is scheduled in the second cell.

Step 204: The network device sends configuration information 1 to the terminal device. The configuration information 1 is used to indicate to schedule downlink data or uplink data of the second cell in the third cell, and the configuration information 1 includes a second identifier of the second cell.

For example, the second identifier of the second cell may be information used by the terminal device to identify the PDCCH of the second cell during cross-cell scheduling, and may be information that can identify the second cell. In an example, one cell may correspond to one downlink carrier. Therefore, the second identifier may alternatively be information that can identify a (downlink) carrier corresponding to the second cell, for example, carrier indication information (namely, a value of cif-InSchedulingCell) or a value of a CIF.

For example, the network device may send the configuration information to the terminal device by using higher layer signaling. The higher layer signaling may be signaling sent by a higher protocol layer, which is at least one protocol layer above a physical layer. The higher protocol layer may include at least one of the following protocol layers: a MAC layer, a radio link control (RLC) layer, a packet data convergence protocol (PDCP) layer, an RRC layer, and a non-access stratum (NAS). For example, the network device may send the configuration information to the terminal device in any one of the one or more serving cells of the terminal device. This is not specifically limited.

Correspondingly, in step 205, the terminal device receives the configuration information 1 sent by the network device.

In this embodiment of this application, the network device may send the configuration information 1 to the terminal device when the second cell is in an activated state, or may send the configuration information 1 to the terminal device when the second cell is in a deactivated state. This is not specifically limited.

The configuration information 1 herein may be understood as configuration information for cross-cell scheduling, and the configuration information 1 may include configuration information of the third cell and configuration information of the second cell. The second cell may be referred to as a scheduled cell, and the third cell may be referred to as a scheduling cell.

The following provides an example structure of configuration information of a cell:

```
CrossCarrierSchedulingConfig ::=   SEQUENCE {
    schedulingCellInfo             CHOICE {
        own                            SEQUENCE {
                                       -- No cross carrier scheduling
            cif-Presence                   BOOLEAN
        },
        other                          SEQUENCE {
                                       -- Cross carrier scheduling
            schedulingCellId               ServCellIndex,
            cif-InSchedulingCell           INTEGER (1..7)
        }
    },
    ...
}
```

In the foregoing structure, CHOICE means selecting one of the listed information options for configuration. There are two options in this structure. One option is own, indicating that cross-cell scheduling is not configured for the cell, that is, scheduling of the cell is performed in the cell itself. The other option is other, indicating that cross-cell scheduling is configured for the cell, that is, downlink data or uplink data of the cell is scheduled in another cell.

Referring to the foregoing example, when configuring the second cell, the network device may select other (indicating that downlink data or uplink data of the cell is scheduled in another cell) in the CrossCarrierSchedulingConfig structure of the second cell. The configuration information of the second cell may include an identifier of the third cell, which corresponds to schedulingCellId in the foregoing example structure, and may further include the second identifier used for the second cell. The second identifier may be carrier indication information used to identify the PDCCH serving the second cell in the third cell, and corresponds to cif-InSchedulingCell in the foregoing example structure, for example, 1. Correspondingly, after receiving the configuration information of the second cell, the terminal device learns, based on other, that the PDCCH of the second cell can be scheduled in another cell, and learns, based on schedulingCellId, that the PDCCH of the second cell can be scheduled in the third cell. When it is learned based on cif-InSchedulingCell that a PDCCH is monitored in the third cell, if the value of the CIF carried in the PDCCH is the value of cif-InSchedulingCell, it is determined that the PDCCH is the PDCCH of the second cell.

Referring to the foregoing example, when configuring the third cell, the network device may select own (indicating that scheduling of the cell is performed in the cell itself) in the CrossCarrierSchedulingConfig structure of the third cell. The configuration information of the third cell may include information indicating whether the DCI includes a carrier indicator field (CIF), which corresponds to cif-Presence in the foregoing example structure. When the third cell is configured as a cell controlling other cells, cif-Presence may be set to True, indicating that the CIF needs to be included. When the third cell is configured to control the PDCCH of the second cell, if a PDCCH of the third cell is sent in the third cell, CIF=0; if the PDCCH of the second cell is sent in the third cell, the value of CIF depends on a related configuration of the second cell. For example, if cif-InSchedulingCell in the configuration information of the second cell is 1, CIF=1 herein. Correspondingly, after receiving the configuration information of the third cell, the terminal device learns, based on own, that the PDCCH of the third cell may be monitored in the third cell; and learns, based on cif-Presence, that the CIF is carried in the PDCCH sent in the third cell (in other words, the PDCCH sent in the third cell may be the PDCCH of the third cell, or may be the PDCCH of another cell; the PDCCH may be specifically identified based on the CIF carried in the PDCCH). When the PDCCH is monitored in the third cell, if it is determined that a value of the CIF carried in the PDCCH is 0, it is learned that the PDCCH is the PDCCH of the third cell. Alternatively, if it is determined that the value of the CIF carried in the PDCCH is 1, it is learned (with reference to the configuration information of the second cell) that the PDCCH is the PDCCH of the second cell.

Figure 2B:
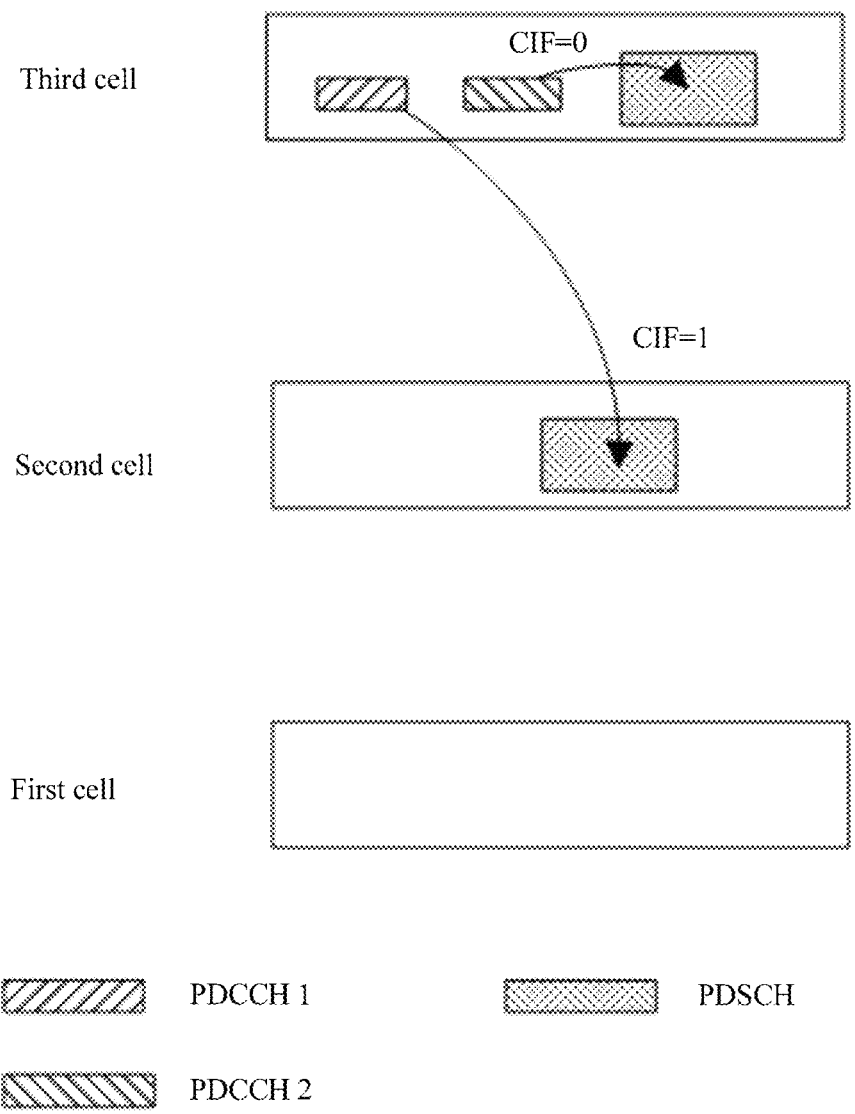
FIG. 2b is a schematic diagram of sending a PDCCH 1 and a PDCCH 2 in a third cell.

For example, FIG. 2b is a schematic diagram of sending the PDCCH (namely, a PDCCH 1) of the second cell and the PDCCH (namely, a PDCCH 2) of the third cell in the third cell. The PDCCH 1 is used to schedule downlink data of the second cell or to schedule a downlink data channel of the second cell, for example, a physical downlink shared channel (PDSCH). The PDCCH 2 is used to schedule downlink data of the third cell or to schedule a PDSCH of the third cell.

Figure 5:
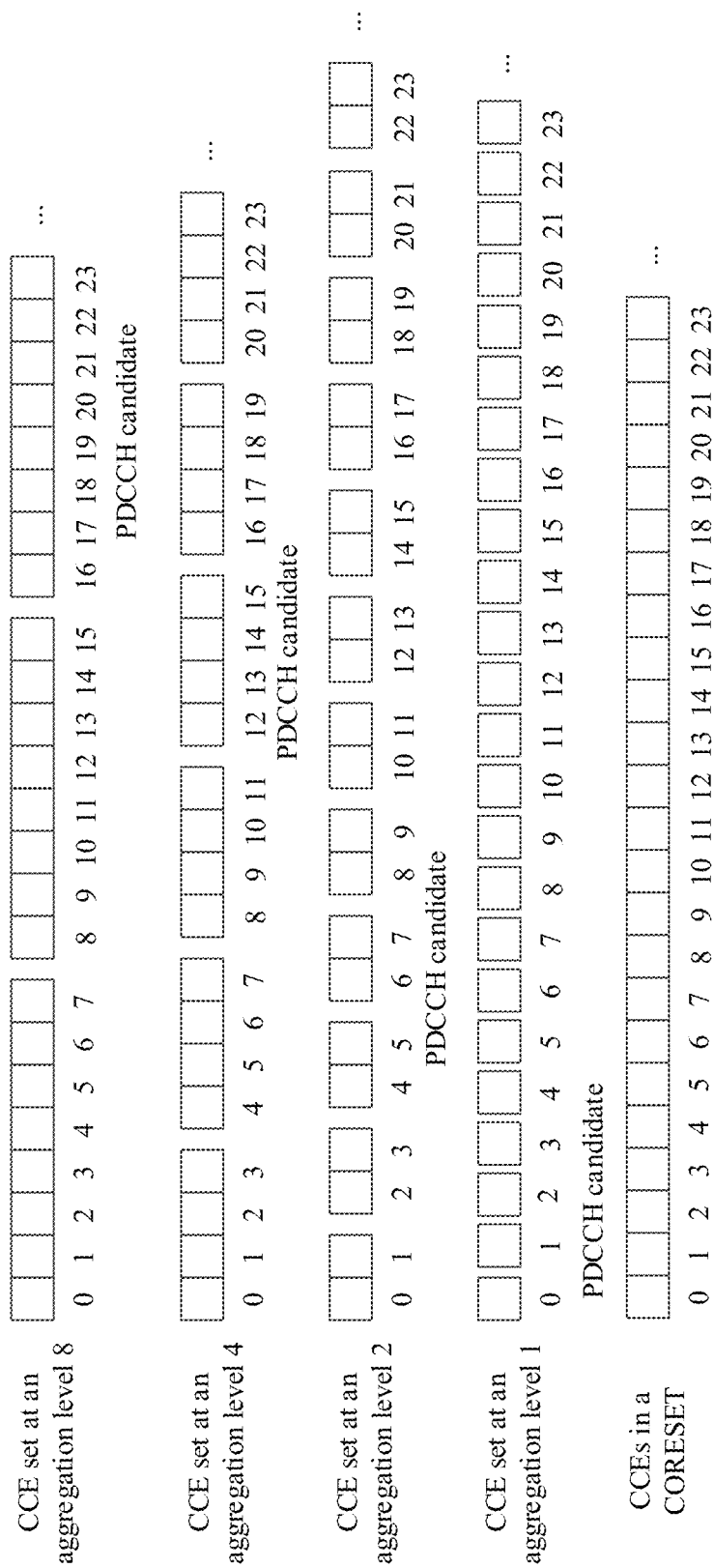
FIG. 5 is a schematic diagram of search space according to an embodiment of this application.

For example, search space (first search space) in which the PDCCH (for example, the PDCCH 2) of the third cell is located may be different from search space (second search space) in which the PDCCH (for example, the PDCCH 1) of the second cell is located. The search space may be understood as a set of PDCCH candidates at an aggregation level. Because an aggregation level (a quantity of control-channel elements (CCE) constituting the PDCCH) is also referred to as the aggregation level) of the PDCCH actually sent by the network device is variable, and there is no related signaling to notify the terminal device, the terminal device needs to blindly detect PDCCHs at different aggregation levels. The PDCCH to be blindly detected is referred to as a candidate PDCCH, and there may be a plurality of candidate PDCCHs at an aggregation level. FIG. 5 is a schematic diagram of search space. The terminal device decodes, in the search space, all PDCCH candidates including CCEs. If cyclic redundancy check (CRC) check succeeds, it is considered that content of a decoded PDCCH is valid for the terminal device, and the terminal device may continue to process decoded related information.

For example, when detecting PDCCH candidates of the second cell in the third cell, the terminal device may calculate an index of the CCE by using the following formula 1:

$$S = L \cdot \left\{ \left( Y_{p,n_{s,f}}^{\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p} / L \rfloor \right\} + i \quad \text{formula 1}$$

where S represents the index of the CCE; $Y_{p,n_{s,f}}^{\mu}$ represents a start position parameter of a frequency domain resource position of the PDCCH when a time domain resource position of the PDCCH is $n_{s,f}^{\mu}$; μ represents a parameter set (SCS) corresponding to a BWP in which the first search space is located; $M_{s,n_{CI}}$ represents a sequence number of a PDCCH candidate in first search space s; $N_{CCE,p}$ represents a quantity of control channel elements CCEs included in p in a control resource set (CORESET); L represents the aggregation level of the PDCCH; $M_{s,max}^{(L)}$ represents a maximum quantity of PDCCH candidates included in various search space (second search space) that is corresponding to the first search space s and that is in activated BWPs of all scheduled cells (the second cell) scheduled in the scheduling cell (the third cell), when the aggregation level is L; i represents an index of a different CCE at a same CCE aggregation level; and $n_{CI}=1$, that is, a value of $n_{CI}$ may be the value of cif-InSchedulingCell configured for the second cell in the configuration information for cross-cell scheduling.

When detecting the PDCCH candidates of the third cell in the third cell, the terminal device may also calculate the index of the CCE by using the formula 1. A difference of detecting the PDCCH candidates of the third cell from detecting the PDCCH candidates of the second cell lies in: $n_{CI}=0$. When detecting the PDCCH candidates of the third cell and the PDCCH candidates of the second cell, the terminal device uses $n_{CI}$ of different values to calculate the index of the CCE. Therefore, the search space in which the PDCCH of the third cell is located is different from the search space in which the PDCCH of the second cell is located.

Step 206: The network device sends scheduling information 1 to the terminal device in the third cell. The scheduling information 1 is used to schedule the downlink data or uplink data of the second cell, and the scheduling information 1 includes the second identifier of the second cell. The network device may send the scheduling information 1 to the terminal device when the second cell is in an activated state.

Correspondingly, in step 207, the terminal device receives the scheduling information 1 in the third cell, and transmits downlink data or the uplink data in the second cell based on the scheduling information 1.

For example, the scheduling information 1 may be DCI, and the second identifier included in the scheduling information 1 may be understood as CIF information (cif-InSchedulingCell) in the configuration information 1 described above.

It should be noted that the third cell and the first cell may be a same cell, or may be different cells. In other words, a cell used to schedule the PDCCH order of the second cell and a cell used to schedule the downlink data or uplink data of the second cell may be a same cell, or may be different cells. This is not specifically limited.

It can be learned from the foregoing method that, in this embodiment of this application, because the control information 1 carries the first identifier of the second cell, random access can be triggered across cells. This effectively reduces a delay in initiating a random access process by the terminal device in the secondary cell. In addition, because the first identifier may be a cell index or a cell identifier, an existing cell index or a cell identifier may be used. This facilitates implementation.

Figure 3:
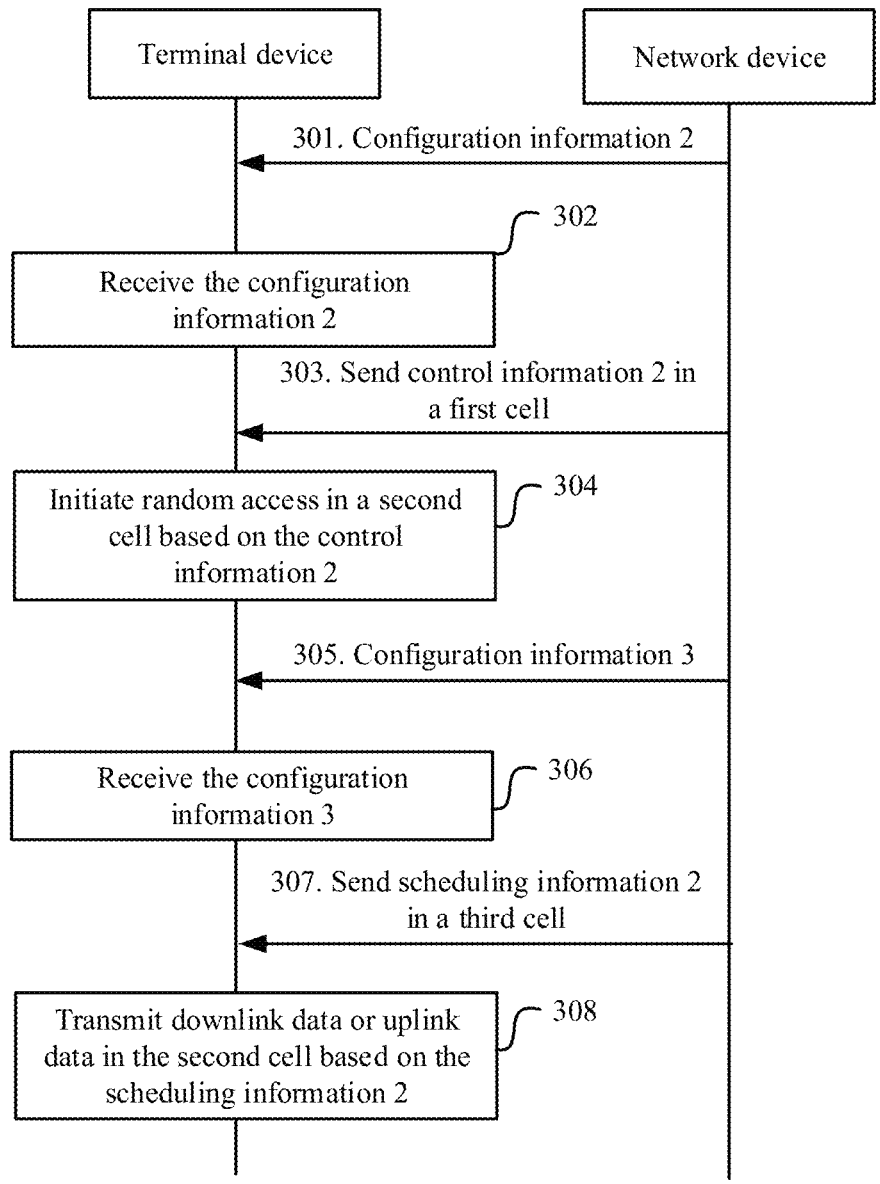
FIG. 3 is a schematic flowchart corresponding to a communication method of Solution 2 according to an embodiment of this application.

Based on the solution 2, FIG. 3 is a schematic flowchart corresponding to a communication method according to an embodiment of this application. As shown in FIG. 3, the method includes the following steps.

Step 301: A network device sends configuration information 2 to a terminal device. The configuration information 2 is used to indicate to monitor a first control channel of a second cell in a first cell, the first control channel is used to carry control information 2, and the configuration information 2 includes a third identifier of the second cell.

Correspondingly, in step 302, the terminal device receives the configuration information 2 sent by the network device.

The configuration information 2 herein may be understood as configuration information for cross-cell PDCCH monitoring. The configuration information 2 may include configuration information of the second cell, and for example, may further include configuration information of the first cell.

The following provides an example structure of configuration information for cross-cell PDCCH monitoring of a cell:

```
CrossCarrierPDCCHMonitoringConfig ::=   SEQUENCE {
   schedulingCellInfo                   CHOICE {
      own                               SEQUENCE {
                                        -- No cross carrier PDCCH
                                        monitoring
         po_cif-Presence                BOOLEAN
      },
      other                             SEQUENCE {
                                        -- Cross carrier PDCCH
                                        monitoring
         controlingCellId               ServCellIndex,
         po_cif-InControlingCell        INTEGER (1..7)
      }
   },
   ...
}
```

In the foregoing structure, CHOICE means selecting one of the listed information options for configuration. There are two options in this structure. One option is own, indicating that cross-cell PDCCH monitoring is not configured for the cell, that is, a PDCCH is monitored for the cell only in the cell itself. The other option is other, indicating that cross-cell PDCCH monitoring is configured for the cell, that is, a PDCCH order of the cell can be sent in another cell.

Referring to the foregoing example, when configuring the second cell, the network device may select other (indicating that PDCCH control information including the PDCCH order of the cell is scheduled in another cell) in the Cross-CarrierPDCCHMonitoringConfig structure of the second cell. The configuration information of the second cell may include an identifier of the first cell, which corresponds to controlingCellId in the foregoing example structure, and may further include the third identifier of the second cell. The third identifier may be carrier indication information used to identify the PDCCH control information (including the PDCCH order) serving the second cell in the first cell, and corresponds to po_cif-InControlingCell in the foregoing example structure, for example, 1. Correspondingly, after receiving the configuration information of the second cell, the terminal device learns, based on other, that the PDCCH of the second cell can be monitored in another cell, and learns, based on controlingCellId, that the PDCCH of the second cell can be monitored in the first cell. When it is learned based on po_cif-InControlingCell that a PDCCH is monitored in the first cell, if a value of a CIF carried in the PDCCH is a value of po_cif-InControlingCell, it is determined that the PDCCH is the PDCCH of the second cell.

Referring to the foregoing example, when configuring the first cell, the network device may select own (indicating that the cell monitors the PDCCH control information including the PDCCH order in the cell itself) in the CrossCarrierPDCCHMonitoringConfig structure of the first cell. The configuration information of the first cell may include information used to indicate whether DCI includes a PDCCH order carrier indicator field (po_cif), which corresponds to po_cif-Presence in the foregoing example structure. When the first cell is configured as a cell controlling PDCCH control information (including a PDCCH order) of another cell, po_cif-Presence may be set to True, indicating that po_CIF needs to be included. When the first cell is configured to control the PDCCH control information (including the PDCCH order) of the second cell, if a PDCCH order of the first cell is sent in the first cell, po_CIF=0; if the PDCCH order of the second cell is sent in the first cell, a value of po_CIF depends on a related configuration of the second cell. For example, if po_cif-InControlingCell in the configuration information of the second cell is 1, po_CIF=1 herein. Correspondingly, after receiving the configuration information of the first cell, the terminal device learns, based on own, that the PDCCH of the first cell may be monitored in the first cell; and learns, based on cif-Presence, that the CIF is carried in the PDCCH sent in the first cell (in other words, the PDCCH sent in the first cell may be the PDCCH of the first cell, or may be the PDCCH of another cell; the PDCCH may be specifically identified based on the CIF carried in the PDCCH). When the PDCCH is monitored in the first cell, if it is determined that the value of the CIF carried in the PDCCH is 0, it is learned that the PDCCH is the PDCCH of the first cell. Alternatively, if it is determined that the value of the CIF carried in the PDCCH is 1, it is learned (with reference to the configuration information of the second cell) that the PDCCH is the PDCCH of the second cell.

For example, search space in which the first control channel of the second cell is located may be the same as search space in which a control channel of the first cell is located. The control channel of the first cell is used to carry, for example, scheduling information of the first cell. The scheduling information of the first cell may be used to schedule downlink data or uplink data of the first cell. For example, the control channel is a PDCCH. When detecting PDCCH candidates of the second cell in the first cell, the terminal device may calculate an index of a CCE by using the foregoing formula 1, where $n_{CI}=0$. When detecting PDCCH candidates of the first cell in the first cell, the terminal device may calculate an index of a CCE by using the foregoing formula 1, where $n_{CI}=0$. In other words, when detecting the PDCCH candidates of the second cell and the PDCCH candidates of the first cell in the first cell, the terminal device may calculate the index of the CCE in a same manner.

Because the search space of the first control channel of the second cell is the same as the search space of the control channel of the first cell, the search space of the first control channel of the second cell does not need to be additionally configured. This can effectively save transmission resources, reduce complexity of detecting the control channel by the terminal device, and save processing resources of the terminal device.

Step 303: The network device sends control information 2 to the terminal device in the first cell. The control information 2 is used to indicate to initiate a random access process in the second cell, and the control information includes the third identifier of the second cell.

Correspondingly, in step 304, the terminal device receives the control information 2 in the first cell, and initiates the random access process in the second cell based on the control information 2.

For example, the control information 2 may be DCI, and one or more of the following fields in the control information 2 are used to carry the third identifier: a newly extended third bit field or a reserved field. A quantity of bits included in the third identifier may be related to a value range of po_CIF. For example, po_CIF may be any one of values from 1 to 7, and the third identifier may include three bits. In another possible example, the third identifier may alternatively include another quantity of bits. This is not specifically limited. It can be learned that, in this solution, the third identifier may include a relatively small quantity of bits, so that the control information 2 includes relatively few effective information field bits. This effectively reduces control signaling overheads.

In this embodiment of this application, a difference between the control information 2 and the foregoing control information 1 lies in that the control information 2 includes the third identifier, and the control information 1 includes a first identifier. For content other than the foregoing difference in the control information 2, refer to the descriptions of the control information 1.

Step 305: The network device sends configuration information 3 to the terminal device. The configuration information 3 is used to indicate to monitor a second control channel of the second cell in the first cell, the second control channel is used to carry scheduling information 2, and the configuration information 3 includes the second identifier of the second cell.

Correspondingly, in step 306, the terminal device receives the configuration information 3 sent by the network device.

For example, the configuration information 3 may be understood as configuration information for cross-cell scheduling. For details, refer to the descriptions of the configuration information 1 in Solution 1. Details are not described herein again.

Search space of the second control channel of the second cell may be different from search space of a control channel of the third cell.

Step 307: The network device sends the scheduling information 2 to the terminal device in the third cell. The scheduling information 2 is used to schedule downlink data or uplink data of the second cell, the scheduling information 2 includes the second identifier, and the second identifier is different from the third identifier.

Correspondingly, in step 308, the terminal device receives, in the third cell, the scheduling information 2 sent by the network device, and transmits downlink data or the uplink data in the second cell based on the scheduling information 2.

For descriptions of the scheduling information 2, refer to the descriptions of the scheduling information 1 in Solution 1.

Figure 4:
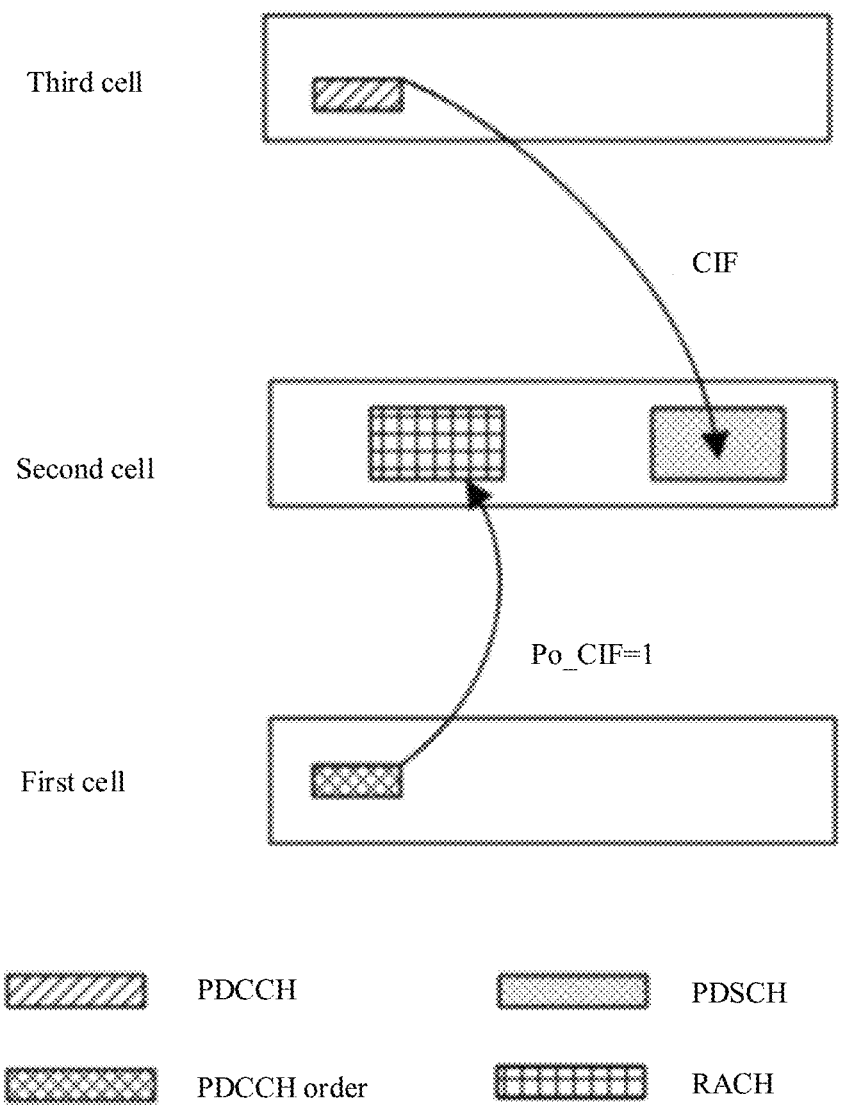
FIG. 4 is a schematic diagram of sending a PDCCH order (a po_CIF) of a second cell in a first cell and sending a PDCCH (a CIF) of a second cell in a third cell.

For example, the third cell and the first cell may be different cells. FIG. 4 is a schematic diagram of sending the PDCCH order (carrying a po_CIF) of the second cell in the first cell and sending the PDCCH (the CIF) of the second cell in the third cell.

It can be learned from the foregoing method that, in this embodiment of this application, because the control information 2 carries the third identifier of the second cell, random access can be triggered across cells. This effectively reduces a delay in initiating a random access process by the terminal device in a secondary cell. In addition, because the third identifier is different from the second identifier configured for cross-cell scheduling, cross-cell random access can be triggered when cross-cell scheduling is not configured. In addition, the search space of the first control channel used to carry the control information 2 and the search space of the control channel of the first cell may be the same. Therefore, compared with a solution in which search space of control channels of different cells during cross-cell scheduling is different, this embodiment of this application can effectively reduce complexity of detecting the control channel by the terminal device.

For the content described above, it should be noted that:

(1) The numbers of the steps in FIG. 2*a* or FIG. 3 are only a possible example of an execution process, and do not constitute a limitation on an execution sequence of the steps. In the embodiments of this application, there is no strict execution sequence between steps that have no time sequence dependency relationship with each other.

(2) A difference between the solution described in FIG. 2*a* and the solution described in FIG. 3 lies in the following: The control information 1 includes the first identifier of the second cell, the control information 2 includes the third identifier of the second cell, the first identifier may be an existing cell index or cell identifier, and the third identifier is a new identifier additionally configured by the network device for the second cell. For content other than the foregoing difference, mutual reference may be made between Solution 1 and Solution 2.

(3) The random access process and the data scheduling process in the embodiments of this application are described as follows: The random access process may include a cell-specific uplink synchronization process. Generally, after completing uplink and downlink synchronization in a cell, the terminal device may start to send and receive data. In other words, the terminal device can perform uplink and downlink data scheduling only after completing uplink synchronization in a cell by performing a random access process. Therefore, the random access process is a necessary process before the terminal device performs uplink and downlink data transmission. Scheduling of uplink and downlink data may be classified into dynamic scheduling and semi-persistent scheduling. Dynamic scheduling means that the terminal device can send and receive data only after receiving the scheduling information (for example, the scheduling information 1 or the scheduling information 2 described above) sent by the network device through the PDCCH. Semi-persistent scheduling means that the network device pre-configures transmission resources for uplink and downlink data through RRC signaling. When semi-persistent scheduling takes effect, the terminal device does not need to monitor the PDCCH, and may send and receive uplink and downlink data on the pre-configured transmission resources. Further, after uplink synchronization is completed for a cell through a random access process, in some cases (for example, there is no data transmission for a long time or there is great interference), the terminal device may suffer uplink out-of-synchronization. In this case, the network device needs to re-trigger a random access process in the cell to restore uplink synchronization.

(4) This embodiment of this application mainly describes sending a PDCCH order across cells. In another possible embodiment, other possible control information may be sent across cells. For specific implementation, refer to the foregoing implementation of sending a PDCCH order across cells. Details are not described herein again.

The foregoing mainly describes the solutions provided in the embodiments of this application from a perspective of interaction between the network device and the terminal device. It may be understood that, to implement the foregoing functions, the network device or the terminal device may include a corresponding hardware structure and/or a software module for performing each function. A person skilled in the art should easily be aware that, in combination with units and algorithm steps of the examples described in the embodiments disclosed in this specification, the embodiments of this application may be implemented by using hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 6:
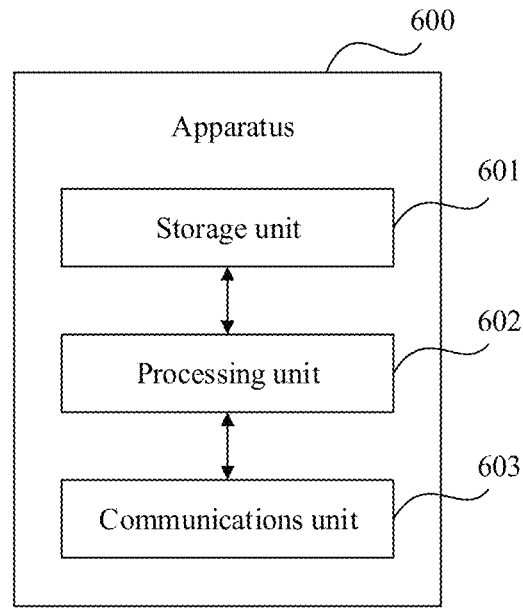
FIG. 6 is a possible example block diagram of an apparatus according to an embodiment of this application.

When an integrated unit (module) is used, FIG. 6 is a possible example block diagram of an apparatus according to an embodiment of this application. The apparatus 600 may exist in a form of software. The apparatus 600 may include a processing unit 602 and a communication unit 603. The processing unit 602 is configured to control and manage an action of the apparatus 600. The communication unit 603 is configured to support the apparatus 600 in communicating with another network entity. Optionally, the communication unit 603 is also referred to as a transceiver unit, and may include a receiving unit and/or a sending unit, which are respectively configured to perform a receiving operation and a sending operation. The apparatus 600 may further include a storage unit 601, configured to store program code and data of the apparatus 600.

The processing unit 602 may be a processor or a controller, and may implement or execute various example logic blocks, modules, and circuits described with reference to the content disclosed in the embodiments of this application. The communication unit 603 may be a communication interface, a transceiver, a transceiver circuit, or the like, where the communication interface is a general name, and may include a plurality of interfaces during specific implementation. The storage unit 601 may be a memory.

The apparatus 600 may be the terminal device in any one of the foregoing embodiments, or may be a chip disposed in the terminal device. The processing unit 602 may support the apparatus 600 in performing an action of the terminal device in the foregoing method examples. Alternatively, the processing unit 602 mainly performs an internal action of the terminal device in the method example, and the communication unit 603 may support communication between the apparatus 600 and a network device. For example, the processing unit 602 is configured to perform step 202, step 203, step 205, and step 207 in FIG. 2a, and step 302, step 304, step 306, and step 308 in FIG. 3.

Specifically, in an embodiment, the communication unit 603 is configured to: receive control information from the network device in a first cell, where the control information is used to indicate to initiate a random access process in a second cell, and the control information includes a first identifier of the second cell; and initiate the random access process in the second cell based on the control information by using a random access parameter associated with the first identifier.

In a possible design, the communication unit 603 is further configured to: receive scheduling information from the network device in a third cell, where the scheduling information is used to schedule downlink data or uplink data of the second cell, the scheduling information includes a second identifier of the second cell, and the second identifier is different from the first identifier.

In a possible design, the communication unit 603 is further configured to: receive configuration information from the network device, where the configuration information is used to indicate to schedule the downlink data or uplink data of the second cell in the third cell, and the configuration information includes the second identifier.

In a possible design, the second cell is in a deactivated state when the control information is received from the network device in the first cell.

In a possible design, the first identifier is configured when the network device adds or modifies the second cell.

In a possible design, one or more of the following fields in the control information are used to carry the first identifier: a first bit field or a reserved field.

In a possible design, the control information is scrambled by using a cell radio network temporary identifier (C-RNTI); or the control information is scrambled by using a downlink control channel order radio network temporary identifier (PO-RNTI).

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

Specifically, in another embodiment, the communication unit 603 is configured to: receive control information from a network device in a first cell, where the control information is used to indicate to initiate a random access process in a second cell, and the control information includes a third identifier of the second cell; initiate the random access process in the second cell based on the control information; receive scheduling information from the network device in a third cell, where the scheduling information is used to schedule downlink data or uplink data of the second cell, the scheduling information includes a second identifier, and the second identifier is different from the third identifier; and transmit downlink data or uplink data in the second cell based on the scheduling information.

In a possible design, the communication unit 603 is further configured to: receive first configuration information from the network device, where the first configuration information is used to indicate to monitor a first control channel of the second cell in the first cell, the first control channel is used to carry the control information, and the first configuration information includes the third identifier.

In a possible design, search space in which the first control channel of the second cell is located is the same as search space in which a control channel of the first cell is located.

In a possible design, the communication unit 603 is further configured to: receive second configuration information from the network device, where the second configuration information is used to indicate to monitor a second control channel of the second cell in the third cell, the second control channel is used to carry the scheduling information, and the second configuration information includes the second identifier.

In a possible design, search space of the second control channel of the second cell is different from search space of a control channel of the third cell.

In a possible design, one or more of the following fields in the control information are used to carry the third identifier: a first bit field or a reserved field.

In a possible design, the control information is scrambled by using a C-RNTI; or the control information is scrambled by using a PO-RNTI.

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

The apparatus 600 may alternatively be the network device in any one of the foregoing embodiments, or a chip disposed in the network device. The processing unit 602 may support the apparatus 600 in performing an action of the network device in the foregoing method examples. Alternatively, the processing unit 602 is mainly configured to perform an internal action of the network device in the method example, and the communication unit 603 is configured to support communication between the apparatus 600 and the terminal device. For example, the communication unit 603 is configured to perform step 201, step 204, and step 206 in FIG. 2a, and step 301, step 303, step 305, and step 307 in FIG. 3.

Specifically, in still another embodiment, the processing unit 602 is configured to: obtain a first identifier of a second cell, where the first identifier is associated with a random access parameter of the second cell. The communication unit 603 is configured to: send control information to a terminal device in a first cell, where the control information is used to indicate to initiate a random access process in the second cell, and the control information includes the first identifier of the second cell.

In a possible design, the communication unit 603 is further configured to: send scheduling information to the terminal device in a third cell, where the scheduling information is used to schedule downlink data or uplink data of the second cell, the scheduling information includes a second identifier of the second cell, and the second identifier is different from the first identifier.

In a possible design, the communication unit 603 is further configured to: send configuration information to the terminal device, where the configuration information is used to indicate to schedule the downlink data or uplink data of the second cell in the third cell, and the configuration information includes the second identifier.

In a possible design, the second cell is in a deactivated state when the control information is sent to the terminal device in the first cell.

In a possible design, the first identifier is configured when the second cell is added or modified.

In a possible design, one or more of the following fields in the control information are used to carry the first identifier: a first bit field or a reserved field.

In a possible design, the control information is scrambled by using a C-RNTI; or the control information is scrambled by using a PO-RNTI.

In a possible design, the control information includes indication information, and the indication information is used to indicate that the control information is a downlink control channel order.

One or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

Specifically, in yet another embodiment, the communication unit 603 is configured to: send control information to a terminal device in a first cell, where the control information is used to indicate to initiate a random access process in a second cell, and the control information includes a third identifier of the second cell; and send scheduling information to the terminal device in a third cell, where the scheduling information is used to schedule downlink data or uplink data of the second cell, the scheduling information includes a second identifier, and the second identifier is different from the third identifier.

In a possible design, the communication unit 603 is further configured to: send first configuration information to the terminal device, where the first configuration information is used to indicate to monitor a first control channel of the second cell in the first cell, the first control channel is used to carry the control information, and the first configuration information includes the third identifier.

In a possible design, search space in which the first control channel of the second cell is located is the same as search space in which a control channel of the first cell is located.

In a possible design, the communication unit 603 is further configured to: send second configuration information to the terminal device, where the second configuration information is used to indicate to monitor a second control channel of the second cell in the third cell, the second control channel is used to carry the scheduling information, and the second configuration information includes the second identifier.

In a possible design, search space in which the second control channel of the second cell is located is different from search space in which a control channel of the third cell is located.

In a possible design, one or more of the following fields in the control information are used to carry the third identifier: a first bit field or a reserved field.

In a possible design, the control information is scrambled by using a cell radio network temporary identifier (C-RNTI); or the control information is scrambled by using a PO-RNTI.

In a possible design, the control information includes indication information, and the indication information is used to indicate that the control information is a downlink control channel order, where one or more of the following fields in the control information are used to carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or the reserved field.

It should be noted that, in the embodiments of this application, division into the units (modules) is an example and is merely logical function division, and may be other division during actual implementation. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or a processor to perform all or some of the steps of the methods described in the embodiments of this application. The storage medium may be various media that can store program code, such as a memory.

Figure 7:
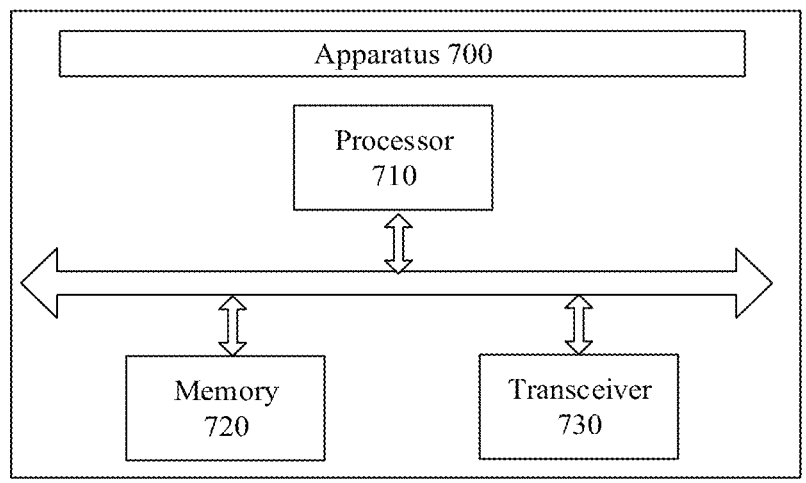
FIG. 7 is a schematic diagram of a structure of an apparatus according to an embodiment of this application.

FIG. 7 is a schematic diagram of a structure of an apparatus. The apparatus 700 includes a processor 710, a memory 720, and a transceiver 730. In an example, the apparatus 700 may implement a function of the apparatus 600 shown in FIG. 6. Specifically, a function of the communication unit 603 shown in FIG. 6 may be implemented by the transceiver, and a function of the processing unit 602 may be implemented by the processor. A function of the storage unit 601 may be implemented by the memory. In another example, the apparatus 700 may be the terminal device in the foregoing method embodiments. The apparatus 700 may be configured to implement the method that corresponds to the terminal device and that is described in the foregoing method embodiments. For details, refer to the descriptions in the foregoing method embodiments.

Figure 8:
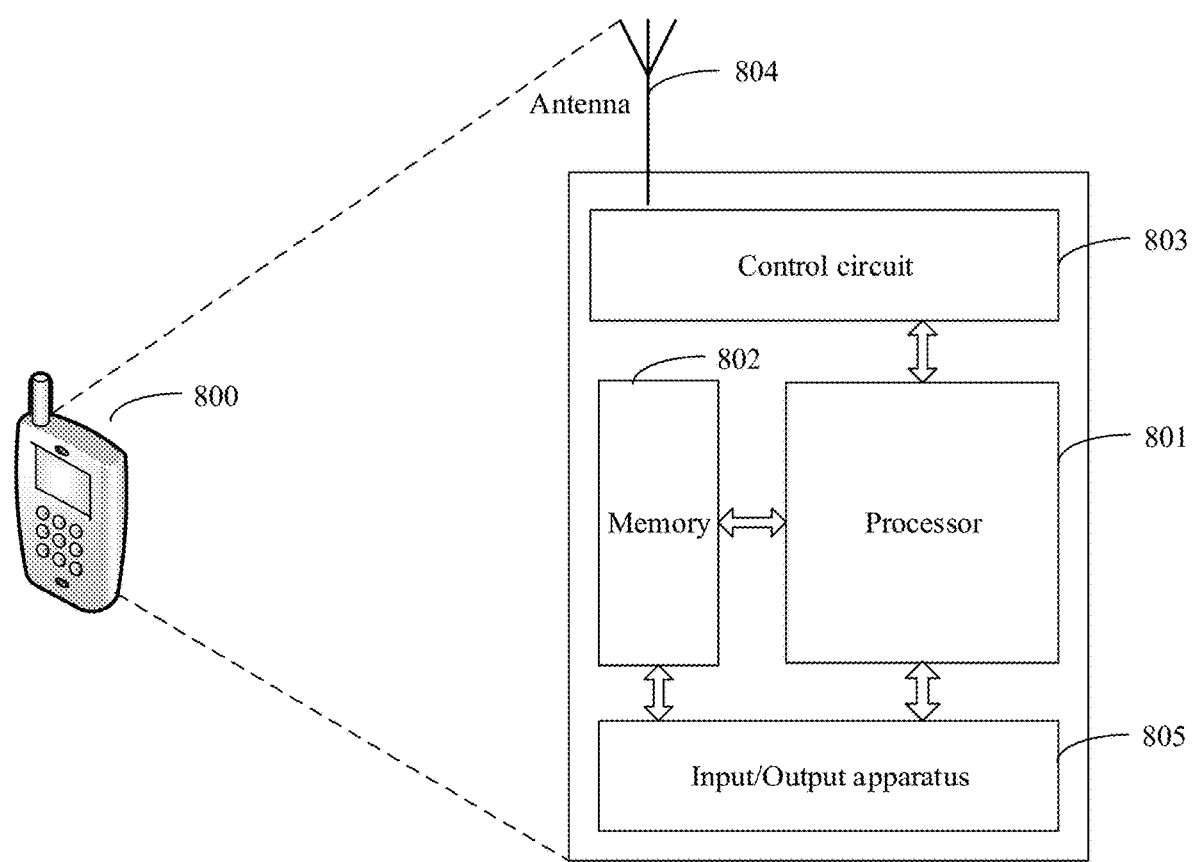
FIG. 8 is a schematic diagram of a structure of a terminal device according to an embodiment of this application.

FIG. 8 is a schematic diagram of a structure of a terminal device 800 according to an embodiment of this application. For ease of description, FIG. 8 shows only main components of the terminal device. As shown in FIG. 8, the terminal device 800 includes a processor 801, a memory 802, a control circuit 803, an antenna 804, and an input/output apparatus 805. The terminal device 800 may be used in the system architecture shown in FIG. 1*a*, to perform a function of the terminal device in the foregoing method embodiments.

The processor 801 is mainly configured to: process a communication protocol and communication data, control the entire terminal device, execute a software program, and process data of the software program, for example, configured to control the terminal device in performing the actions described in the foregoing method embodiments. The memory 802 is mainly configured to store the software program and the data. The control circuit 803 is mainly configured to: perform conversion between a baseband signal and a radio frequency signal, and process the radio frequency signal. The control circuit 803 and the antenna 804 together may also be referred to as a transceiver, and are mainly configured to send and receive a radio frequency signal in an electromagnetic wave form. The input/output apparatus 805, such as a touchscreen, a display, or a keyboard, is mainly configured to: receive data entered by a user, and output data to the user.

After the terminal device is powered on, the processor 801 may read the software program in the memory 802, explain and execute instructions of the software program, and process the data of the software program. When data needs to be sent in a wireless manner, the processor 801 performs baseband processing on the to-be-sent data, and outputs a baseband signal to a radio frequency circuit. After performing radio frequency processing on the baseband signal, the radio frequency circuit sends a radio frequency signal outward in an electromagnetic wave form by using the antenna 804. When data is sent to the terminal device, the radio frequency circuit receives a radio frequency signal by using the antenna, converts the radio frequency signal into a baseband signal, and outputs the baseband signal to the processor 801. The processor 801 converts the baseband signal into data, and processes the data.

A person skilled in the art may understand that, for ease of description, FIG. 8 shows only one memory 802 and one processor 801. An actual terminal device may include a plurality of processors 801 and a plurality of memories 802. The memory 802 may also be referred to as a storage medium, a storage device, or the like. This is not limited in the embodiments of this application.

In an optional implementation, the processor 801 may include a baseband processor and a central processing unit. The baseband processor is mainly configured to process the communication protocol and the communication data. The central processing unit is mainly configured to: control the entire terminal device, execute the software program, and process the data of the software program. The processor 801 in FIG. 8 integrates functions of the baseband processor and the central processing unit. A person skilled in the art can understand that the baseband processor and the central processing unit may be alternatively processors independent of each other, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor 801, or may be stored in the memory 802 in a form of a software program. The processor 801 executes the software program to implement a baseband processing function.

The terminal device 800 shown in FIG. 8 can implement processes related to the terminal device in the method embodiments shown in FIG. 2*a* and FIG. 3. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

Figure 9:
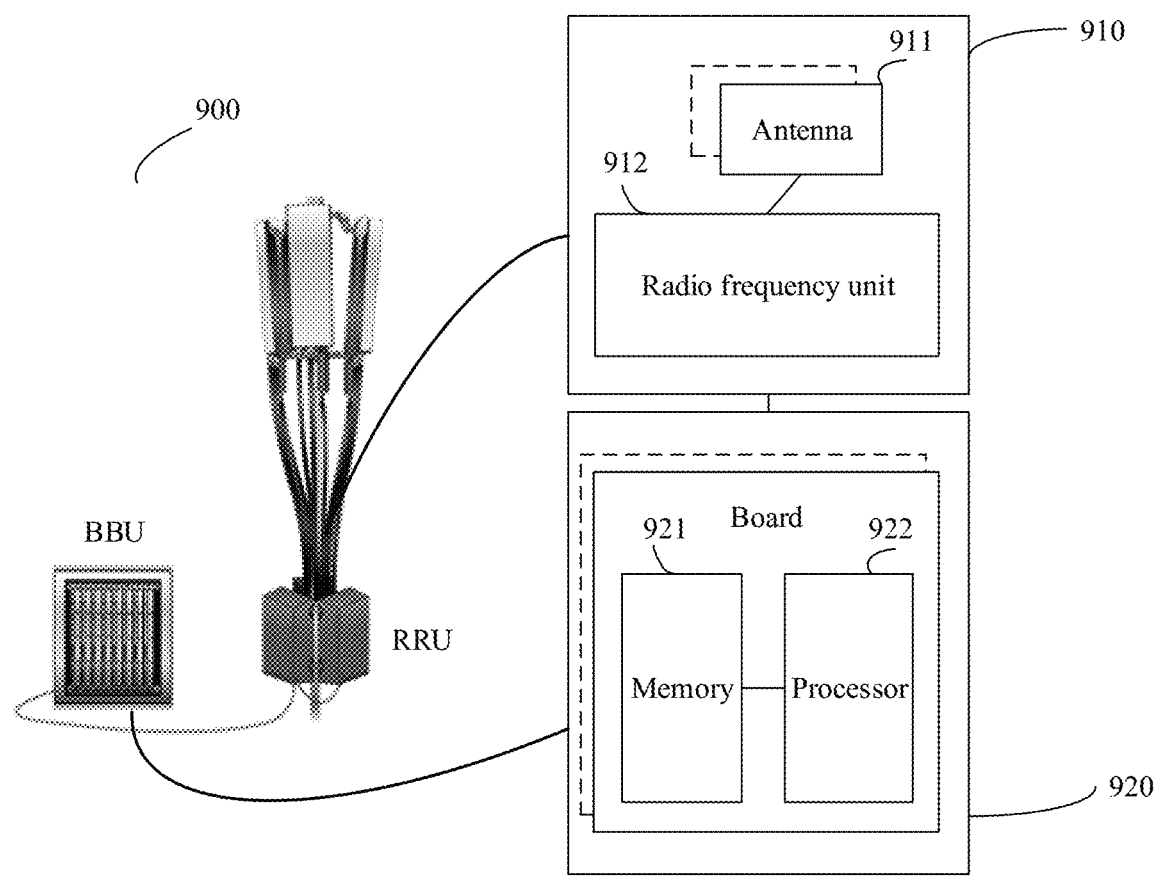
FIG. 9 is a schematic diagram of a structure of a network device according to an embodiment of this application.

FIG. 9 is a schematic diagram of a structure of a network device 900 according to an embodiment of this application. As shown in FIG. 9, the network device 900 includes one or more radio frequency units, such as a remote radio unit (RRU) 910 and one or more baseband units (BBUs) (which may also be referred to as digital units, DUs) 920. The RRU 910 may be referred to as a communication unit, and corresponds to the communication unit 603 in FIG. 6. Optionally, the communication unit may alternatively be referred to as a transceiver, a transceiver circuit, or the like, and may include at least one antenna 911 and a radio frequency unit 912. The RRU 910 is mainly configured to: receive and send a radio frequency signal, and perform conversion between a radio frequency signal and a baseband signal. For example, the RRU 910 is configured to send indication information to a terminal device. The BBU 920 is mainly configured to: perform baseband processing, control a base station, and the like. The RRU 910 and the BBU 920 may be physically disposed together, or may be physically disposed separately, namely, a distributed base station.

The BBU 920 is a control center of the base station, and may also be referred to as a processing module. The BBU 920 may correspond to the processing unit 602 in FIG. 6, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 920 may include one or more boards, and a plurality of boards may jointly support a radio access network (for example, an LTE network) in a single access standard, or may separately support radio access networks (for example, an LTE network, and a 5G network or another network) in different access standards. The BBU 920 further includes a memory 921 and a processor 922. The memory 921 is configured to store necessary instructions and data. The processor 922 is configured to control the base station to perform necessary actions, for example, configured to control the base station to perform an operation procedure related to the network device in the foregoing method embodiments. The memory 921 and the processor 922 may serve one or more boards. In other words, a memory and a processor may be independently disposed on each board, or a plurality of boards may share a same memory and a same processor. In addition, a necessary circuit may be further disposed on each board.

The network device 900 shown in FIG. 9 can implement processes related to the network device in the method embodiments shown in FIG. 2a and FIG. 3. The operations and/or the functions of the modules in the network device 900 are intended to implement corresponding procedures in the foregoing method embodiments. For details, refer to the descriptions in the foregoing method embodiments. To avoid repetition, detailed descriptions are properly omitted herein.

In an implementation process, the steps of the methods in the embodiments can be completed by using a hardware integrated logical circuit in the processor, or by using instructions in a form of software. The steps of the methods disclosed with reference to the embodiments of this application may be directly performed and completed by a hardware processor, or may be performed and completed by using a combination of hardware and software modules in the processor.

It should be noted that, the processor in the embodiments of this application may be an integrated circuit chip, and has a signal processing capability. In an implementation process, the steps in the foregoing method embodiments may be completed by using a hardware integrated logic circuit in a processor or instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof, or may be a combination implementing a computing function, for example, a combination including one or more microprocessors or a combination of a DSP and a microprocessor. The general-purpose processor may be a microprocessor, or the processor may be any conventional processor, or the like.

It may be understood that the memory or storage unit in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that, the memory in the system and method described in this specification is intended to include but is not limited to these memories and any memory of another proper type.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer programs or instructions. When the computer programs or instructions are loaded and executed on a computer, the procedure or functions according to the embodiments of this application are all or partially generated. The computer may be a general-purpose computer, a special-purpose computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

The steps of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in an ASIC, and the ASIC may be disposed in a terminal device. Optionally, the processor and the storage medium may alternatively be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication method, wherein the method comprises:
receiving control information from a network device in a first cell, wherein the control information indicates to initiate a random access process in a second cell, and the control information comprises a first identifier of the second cell;
initiating, based on the control information, the random access process in the second cell by using a random access parameter associated with the first identifier; and
receiving scheduling information from the network device in a third cell, wherein the scheduling information is used to schedule downlink data or uplink data of the second cell, the scheduling information comprises a second identifier of the second cell, and the second identifier is different from the first identifier.

2. The method according to claim 1, wherein the method further comprises:
receiving configuration information from the network device, wherein the configuration information indicates to schedule downlink data or uplink data of the second cell in the third cell, and the configuration information comprises the second identifier.

3. The method according to claim 1, wherein the second cell is in a deactivated state when the control information is received from the network device in the first cell.

4. The method according to claim 1, wherein the first identifier is configured when the network device adds or modifies the second cell.

5. The method according to claim 1, wherein one or more of the following fields in the control information carry the first identifier:
a first bit field or a reserved field.

6. The method according to claim 1, wherein:
the control information is scrambled by using a cell radio network temporary identifier (C-RNTI); or
the control information is scrambled by using a downlink control channel order radio network temporary identifier (PO-RNTI).

7. The method according to claim 1, wherein the control information comprises indication information, and the indication information indicates that the control information is a downlink control channel order, wherein one or more of the following fields in the control information carry the indication information: a hybrid automatic repeat request (HARQ) process number indicator field, a redundancy version (RV) indicator field, a modulation and coding scheme indicator field, a frequency domain resource assignment indicator field, a time domain resource assignment indicator field, a new data indicator field, a transmit power control indicator field, a frequency hopping indicator field, a second bit field, or a reserved field.

8. A communication method, wherein the method comprises:
obtaining a first identifier of a second cell, wherein the first identifier is associated with a random access parameter of the second cell;
sending control information to a terminal device in a first cell, wherein the control information indicates to initiate a random access process in the second cell, and the control information comprises the first identifier of the second cell; and
sending scheduling information to the terminal device in a third cell, wherein the scheduling information is used to schedule downlink data or uplink data of the second cell, the scheduling information comprises a second identifier of the second cell, and the second identifier is different from the first identifier.

9. The method according to claim 8, wherein the method further comprises:
sending configuration information to the terminal device, wherein the configuration information indicates to schedule downlink data or uplink data of the second cell in the third cell, and the configuration information comprises the second identifier.

10. An apparatus comprises:
at least one processor;
a receiver; and
one or more memories coupled to the at least one processor and storing programming instructions for execution by the at least one processor to:
receive, by the receiver, control information from a network device in a first cell, wherein the control information indicates to initiate a random access process in a second cell, and the control information comprises a first identifier of the second cell;
initiate, based on the control information, the random access process in the second cell by using a random access parameter associated with the first identifier; and
receive scheduling information from the network device in a third cell, wherein the scheduling information is used to schedule downlink data or uplink data of the second cell, the scheduling information comprises a second identifier of the second cell, and the second identifier is different from the first identifier.

11. The apparatus according to claim 10, wherein the programming instructions are for execution by the at least one processor to receive configuration information from the network device, wherein the configuration information indicates to schedule downlink data or uplink data of the second cell in the third cell, and the configuration information comprises the second identifier.

12. The apparatus according to claim 10, wherein the second cell is in a deactivated state when the control information is received from the network device in the first cell.

13. The apparatus according to claim 10, wherein the first identifier is configured when the network device adds or modifies the second cell.

14. The apparatus according to claim 10, wherein one or more of the following fields in the control information carry the first identifier:
a first bit field or a reserved field.

15. The apparatus according to claim 10, wherein:
the control information is scrambled by using a cell radio network temporary identifier (C-RNTI); or
the control information is scrambled by using a downlink control channel order radio network temporary identifier (PO-RNTI).

16. An apparatus comprising:
at least one processor; and
one or more memories coupled to the at least one processor and storing programming instructions for execution by the at least one processor to:
obtain a first identifier of a second cell, wherein the first identifier is associated with a random access parameter of the second cell;

send control information to a terminal device in a first cell, wherein the control information indicates to initiate a random access process in the second cell, and the control information comprises the first identifier of the second cell; and send scheduling information to the terminal device in a third cell, wherein the scheduling information is used to schedule downlink data or uplink data of the second cell, the scheduling information comprises a second identifier of the second cell, and the second identifier is different from the first identifier.

17. The apparatus according to claim 16, wherein the programming instructions are for execution by the at least one processor to send configuration information to the terminal device, wherein the configuration information indicates to schedule downlink data or uplink data of the second cell in the third cell, and the configuration information comprises the second identifier.

* * * * *